United States Patent
Makuta

(10) Patent No.: US 7,673,592 B2
(45) Date of Patent: Mar. 9, 2010

(54) VEHICULAR COOLING SYSTEM

(75) Inventor: Yohei Makuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 11/527,603

(22) Filed: Sep. 27, 2006

(65) Prior Publication Data

US 2007/0074682 A1 Apr. 5, 2007

(30) Foreign Application Priority Data

Sep. 30, 2005 (JP) .............................. 2005-288844
Sep. 30, 2005 (JP) .............................. 2005-288945

(51) Int. Cl.
*F01P 7/16* (2006.01)
(52) U.S. Cl. ..................... 123/41.09; 429/20
(58) Field of Classification Search ............. 123/41.01, 123/41.08, 41.09, 41.1; 429/20, 22, 24, 26
See application file for complete search history.

(56) References Cited

U.S. PATENT DOCUMENTS

| | | | | |
|---|---|---|---|---|
| 3,246,637 | A * | 4/1966 | Walsh ....................... | 123/41.1 |
| 3,255,740 | A * | 6/1966 | Walsh ....................... | 123/41.09 |
| 6,405,688 | B1 * | 6/2002 | Dahm et al. ............... | 123/41.1 |
| 6,905,792 | B2 * | 6/2005 | Imaseki et al. ............. | 429/20 |
| 6,955,141 | B2 * | 10/2005 | Santanam et al. ......... | 123/41.08 |
| 7,000,685 | B2 * | 2/2006 | Morishita et al. .......... | 165/80.4 |
| 7,070,873 | B2 * | 7/2006 | Imaseki et al. ............. | 429/26 |
| 7,096,935 | B2 * | 8/2006 | Ieda et al. ................... | 165/202 |
| 7,128,025 | B1 * | 10/2006 | Westhoff et al. ......... | 123/41.01 |
| 7,261,068 | B1 * | 8/2007 | Wantschik ................ | 123/41.29 |
| 7,267,084 | B2 * | 9/2007 | Lutze et al. ............... | 123/41.02 |
| 7,294,422 | B2 * | 11/2007 | Imaseki et al. ............. | 429/24 |
| 7,299,771 | B2 * | 11/2007 | Wei et al. .................. | 123/41.08 |
| 7,334,544 | B2 * | 2/2008 | Eberspach ................. | 123/41.1 |
| 7,402,355 | B2 * | 7/2008 | Imaseki et al. ............. | 429/26 |
| 7,406,929 | B2 * | 8/2008 | Hassdenteufel et al. .... | 123/41.1 |
| 2006/0201666 | A1 * | 9/2006 | Sonoda et al. ............. | 165/180 |
| 2006/0269807 | A1 * | 11/2006 | Fujita et al. ................ | 429/26 |
| 2007/0122671 | A1 * | 5/2007 | Shimizu et al. ............. | 429/26 |
| 2008/0217087 | A1 * | 9/2008 | Ito et al. .................... | 180/220 |

(Continued)

FOREIGN PATENT DOCUMENTS

JP 11-93666 S 4/1999

(Continued)

*Primary Examiner*—Hai H Huynh
(74) *Attorney, Agent, or Firm*—Birch, Stewart, Kolasch & Birch, LLP

(57) ABSTRACT

A cooling system includes a radiator for radiating heat of a coolant heated by a fuel cell, and a first main pipe line and a second main pipe line which allow coolant to circulate between the fuel cell and the radiator. A thermostat is located midway through the second main pipe line and adapted to switch the circulation path for the coolant, and a bypass pipe line. The radiator includes a first tank connected to the first main pipe line, a second tank connected to the second main pipe line, and a cooling portion provided between the first tank and the second tank and adapted to perform heat exchange with the outside air. The thermostat is connected to the first tank by the bypass pipe line. The resulting configuration facilitates pipe line routing and increases the freedom of the layout of components.

15 Claims, 17 Drawing Sheets

U.S. PATENT DOCUMENTS

2009/0000837 A1 * 1/2009 Horii et al. ................ 180/65.3

FOREIGN PATENT DOCUMENTS

| | | | |
|---|---|---|---|
| JP | 2002-4858 | * | 1/2002 |
| JP | 2004-349248 | * | 12/2004 |
| JP | 2005-119600 A | | 5/2005 |
| JP | 2007-100542 | * | 4/2007 |

* cited by examiner

VEHICULAR COOLING SYSTEM

CROSS-REFERENCE TO RELATED APPLICATION

The present application claims priority under 35 U.S.C. §119 to Japanese Patent Application Nos. 2005-288844 and 2005-288945, both filed on Sep. 30, 2005, the entire contents of which are hereby incorporated by reference.

BACKGROUND OF THE INVENTION

1. Field of the Invention

The present invention relates to a vehicular cooling system having a heat source, such as a fuel cell or an engine, and a radiator for radiating heat of coolant heated by the heat source. More specifically, the present invention relates to a vehicular cooling system having a selector switch such as a thermostat for switching the coolant circulation path.

2. Description of Background Art

In recent years, there have been developed fuel cell vehicles in which electric power generated by a fuel cell system is supplied to a motor and wheels are driven by the motor. In the above-mentioned fuel cell system, electric power is generated by chemical reaction between hydrogen as fuel gas and oxygen as reactant gas in a fuel cell stack (hereinafter, simply referred to as the "fuel cell"). Here, oxygen is taken in from the air through a compressor, and hydrogen is supplied from a high-pressure fuel cylinder.

A fuel cell generates heat through chemical reaction. For efficient power generation, excess heat must be radiated away to cool the fuel cell to keep it within an appropriate temperature range. For efficient heat radiation, such as a fuel cell vehicle disclosed in JP-A No. 2005-119600, for example, a water-cooling type cooling system may be employed to cool the fuel cell and radiate heat out of the heated cooling water by a radiator.

In the fuel cell vehicle disclosed in JP-A No. 2005-119600, a reservoir tank is provided above the fuel cell, and the reservoir tank is provided with a degassing mechanism capable of automatically removing air entering the coolant.

Although the reservoir tank described in JP-A No. 2005-119600 above allows removal of air entering the pipeline in the cooling system, it is difficult to release air entering the fuel cell to the pipeline or the reservoir tank. Accordingly, the air in the fuel cell may remain in an upper part of the fuel cell for a long time, resulting in deterioration in cooling efficiency.

Further, when the temperature is below an appropriate temperature and a warm-up is required, the circulation path for coolant may be switched by a thermostat (see, for example, JP-A No. H11-93666) to allow the coolant to be bypassed without passing through the radiator, thereby promoting temperature rise.

In a fuel cell motorcycle, a large number of components such as a fuel cell, a supercharger, and a humidifier must be disposed within a narrow confined space. Accordingly, it is desirable that routing of the pipe line between these components can be easily performed so as not to interfere with the layout of other components. It is desirable that not only the pipe line of a supply system for fuel gas and reactant gas to which a supercharger, a humidifier, and so on are connected, but also the pipe line in the cooling system be disposed in an appropriate manner so as not to affect the arrangement of other components.

Further, typical motorcycles or four-wheeled vehicles are also mounted with a cooling system having an engine and an electric motor as heat sources and a radiator for cooling these components. Since these vehicles do not necessarily have a large engine room, the pipe line arrangement in the cooling system must be performed in an appropriate manner.

The present invention has been made in view of the above-mentioned problem, and accordingly it is an object of the present invention to provide a cooling system for a fuel cell vehicle which allows efficient removal of air entering a fuel cell. It is a further object of the present invention to provide a vehicular cooling system which allows easy pipe line routing and an increase in the freedom of the layout of components.

SUMMARY AND OBJECTS OF THE INVENTION

According to a first aspect of the present invention, a vehicular cooling system includes a radiator for radiating heat of coolant heated by a heat source; a first main pipe line and a second main pipe line which allow coolant to circulate between the heat source and the radiator; and a selector valve located midway through the second main pipe line and adapted to switch a circulation path for the coolant. The radiator has a first tank connected to the first main pipe line, a second tank connected to the second main pipe line, and a cooling portion provided between the first tank and the second tank and adapted to perform heat exchange with outside air, and the selector valve is connected to the first tank by a bypass pipe line.

When the first tank and the selector switch are connected to each other by the bypass pipe line as described above, this means that, as a circuit, the selector switch is connected to the first main pipe line. That is, the first tank serves as a part of the passage of the first main pipe line. The bypass pipe line 210 can be thus set as a short pipe line up to the first tank 102, thereby facilitating the pipe line routing and increasing the freedom of the layout of components.

The first tank has an elongated configuration, and the first main pipe line and the bypass pipe line are connected on opposite sides as viewed from a center position in the elongated direction of the first tank. Accordingly, the length of the first tank is effectively utilized to arrange the first main pipe line and the bypass pipe line at a distance from each other, allowing a space to be secured therebetween to achieve a further increase in the freedom of layout.

The selector valve used may be a thermostat for switching a flow path in accordance with a temperature of the coolant.

According to the first aspect of the present invention, the first tank and the selector valve are connected to each other by the bypass pipe line. This means that, as a circuit, the selector valve is connected to the first main pipe line. That is, the first tank serves as a part of the passage of the first main pipe line. Accordingly, only the bypass pipe line suffices as the pipe line from the first main pipe line to the selector valve, whereby pipe line routing is facilitated and the freedom of the layout of components is increased.

According to a second aspect of the present invention, a cooling system is provided for a fuel cell vehicle that runs on electric power obtained by supplying reactant gas and hydrogen gas to a fuel cell. The cooling system is provided with a radiator for radiating heat of coolant heated by the fuel cell; a first pipe line for supplying the coolant heated by the fuel cell to the radiator; and a second pipe line for supplying the coolant whose heat has been radiated by the radiator to the fuel cell. One end of the first pipe line is connected to an upper surface of the fuel cell.

When the first pipe line is connected to the upper surface of the fuel cell as described above, the air entering the fuel cell floats upward and is thus smoothly discharged to the first pipe line for efficient removal. This makes it possible to suppress a decrease in the efficiency of power generation by the fuel cell.

Further, when one end of the second pipe line is connected to the lower surface of the fuel cell, in the case where air enters the second pipe line as well, the air is discharged to the first pipe line via the fuel cell.

Further, when the first pipe line and the second pipe line are provided on outer sides of the fuel cell in the vehicle width direction, a space is secured in the portion in front or in rear of the fuel cell, so the first pipeline and the second pipe line do not interfere with the layout of other equipment.

When an air vent port that can be opened and closed is provided at the connecting portion between the fuel cell and the first pipe line, the air that has floated upward in the fuel cell can be removed from the air vent port. Further, when the air vent port is provided at a locally elevated position, it is possible to prevent air from accumulating in the first pipe line.

In addition, the first pipe line is connected to the upper surface of the fuel cell, allowing air entering the fuel cell to float upward to be smoothly discharged to the first pipe line for efficient removal. This makes it possible to suppress a decrease in the efficiency of power generation by the fuel cell.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
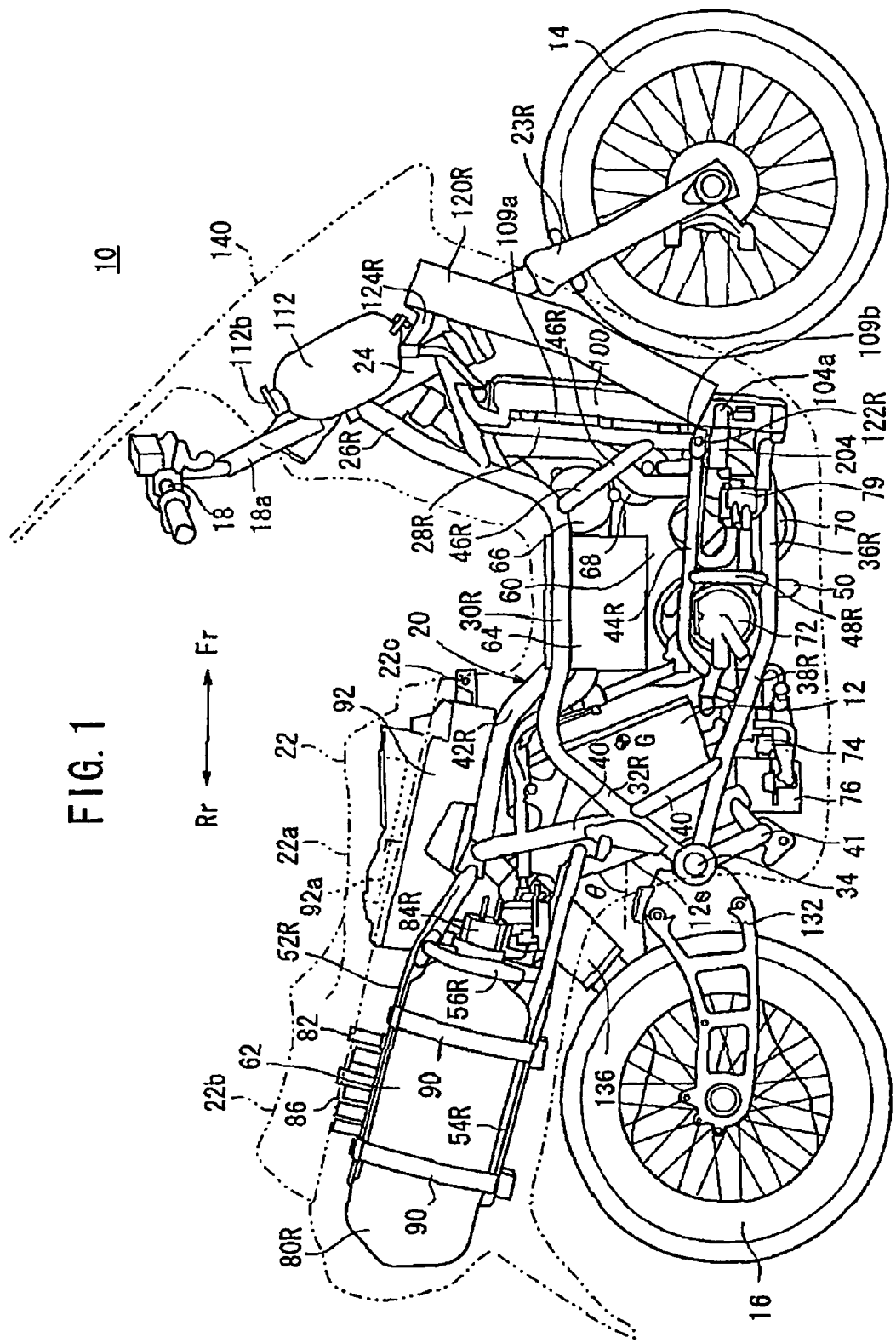
FIG. 1 is a right-hand side view of a fuel cell vehicle.

An embodiment of a vehicular cooling system according to the present invention will now be described with reference to the attached FIGS. 1 to 17. A cooling system 200 according to this embodiment is mounted in a fuel cell motorcycle 10. In the following description, as for mechanisms respectively provided on the left and right sides in the fuel cell motorcycle 10 according to this embodiment, a distinction is drawn between the mechanism on the left side and the mechanism on the right side by denoting the former by symbol "L" and the latter by symbol "R." Further, for ease of understanding, in the drawings also, the arrow indicating the left is denoted by "L" and the arrow indicating the right is denoted by "R," and the arrow indicating the front is denoted by "Fr" and the arrow indicating the rear is denoted by "Rr."

As shown in FIGS. 1 to 5, the fuel cell motorcycle 10 as an example of the fuel cell motorcycle according to this embodiment is a motorcycle mounted with a fuel cell 12 and adapted to run using electric power obtained from the fuel cell 12. The fuel cell 12 generates electric power through reaction between hydrogen gas supplied to an anode electrode and reactant gas (air) supplied to a cathode electrode. Since a known fuel cell is employed as the fuel cell 12 in this embodiment, a detailed description thereof will not be given here. The fuel cell motorcycle 10 has a front wheel 14 as a steering wheel, a rear wheel 16 as a drive wheel, a handlebar 18 for steering the front wheel 14, a frame 20, and a seat 22. The seat 22 is of a tandem type, with a front portion 22a on which the rider sits and a rear portion 22b on which the pillion passenger sits being formed integrally.

Further, the fuel cell motorcycle 10 has a water cooling type cooling system 200 (see FIG. 12) for cooling the fuel cell 12 to keep the fuel cell 12 within an appropriate temperature range so as to enable efficient power generation.

The frame 20 has a head pipe 24 rotatably supporting fork-type front suspensions 23L, 23R in a front portion thereof, a pair of upper down frames 26L, 26R connected to the head pipe 24 at their front portions and inclined rearwardly downward toward the rear of the vehicle body, and lower down frames 28L, 28R extending substantially vertically downward from the head pipe 24. The upper down frames 26L, 26R are connected to a pivot 34 via substantially horizontal upper central frames 30L, 30R and upper pivot frames 32L, 32R that are inclined downwardly rearward, respectively. The upper down frame 26L, the upper central frame 30L, and the upper pivot frame 32L, and the upper down frame 26R, the upper central frame 30R, and the upper pivot frame 32R are each formed by bending a single pipe.

The lower down frames 28L, 28R are connected to the pivot 34 via substantially horizontal lower central frames 36L, 36R and lower pivot frames 38L, 38R that are gently inclined upwardly rearward, respectively. The lower down frame 28L, the lower central frame 36L, and the lower pivot frame 38L, and the lower down frame 28R, the lower central frame 36R, and the lower pivot frame 38R are each formed by bending a single pipe.

The frame 20 further includes: an upper arch frame 40 for connecting between substantially central portions of the lower pivot frame 38L and lower pivot frame 38R in the form of an upwardly convex arch; a lower arch frame 41 connecting between the left and right ends of the pivot 34 in the form of a slightly downwardly convex arch; upper sub-frames 42L, 42R respectively connecting between the upper central frames 30L, 30R and the upper portion of the upper arch frame 40; side frames 44L, 44R respectively connecting between the portions of the lower down frames 28L, 28R slightly below the center thereof and the lower pivot frames 38L, 38R; front sub-frames 46L, 46R connecting between substantially central portions of the lower down frames 28L, 28R and the lower ends of the upper down frames 26L, 26R; sub-frames 48L, 48R respectively connecting between the side frames 44L, 44R and the lower central frames 36L, 36R; and a bottom frame 50 connecting the lower central frames 36L and 36R to each other from below. The upper arch frame 40 is connected so as to cross the upper pivot frames 32L, 32R, and extend upward and diagonally rearward so as to be inclined rearward as seen in side view. A main stand and a side stand (not shown) are mounted to the lower arch frame 41.

As seen in bottom view (see FIG. 4), in the portions of the lower pivot frames 38L, 38R located in front of their intermediate portions, the distance between the lower pivot frames 38L, 38R becomes narrower toward the front for connection to the lower central frames 36L, 36R, respectively. The maximum width of the distance between the lower pivot frames 38L and 38R is approximately twice that between the lower central frames 36L and 36R in parallel to each other.

As seen in top view (see FIG. 3), the distance between the upper central frames 30L and 30R is substantially the same as the distance between the lower central frames 36L and 36R (see FIG. 4), and is set to a width that can be straddled by the rider. The side frames 44L and 44R project outward with respect to the upper central frames 30L, 30R, respectively. The distance between the side frame 44L and the upper central frame 30L, and the distance between the side frame 44R and the upper central frame 30R are set to be larger than the width of the human foot; stepping plates (footrest portions) 51R, 51L on which the rider rests his/her feet are provided in the respective gaps. The stepping plates 51R, 51L are formed integrally with a fairing 140 (see FIG. 1).

The frame 20 further includes a pair of upper rear frames 52L, 52R extending gently rearwardly upward to the rear from the upper side portion of the upper arch frame 40, and a pair of lower rear frames 54L, 54R extending rearwardly upward to the rear from a substantially intermediate height portion. The upper rear frames 52L, 52R extend substantially linearly. As seen in side view (see FIGS. 1 and 2), the lower rear frames 54L, 54R are substantially parallel to the upper rear frames 52L, 52R. As seem in bottom view (see FIG. 4), in the portion of the lower rear frames 54L, 54R located in front of the rear wheel 16, the distance between the lower rear frames 54L, 54R is of the same width as the distance between the lower pivot frames 38L, 38R, and in the portion extending to the rear therefrom, the distance therebetween is set to a smaller width. The front portion with a large width and the rear portion that is narrower in width are connected to each other so as to allow the width to change gradually. The distance between the upper rear frames 52L and 52R, and the distance between the lower rear frames 54L and 54R are each set to a width slightly larger than the width of the rear wheel 16. The upper rear frames 52L, 52R and the lower rear frames 54L, 54R are connected to each other by vertical auxiliary frames 56L, 56R, respectively.

In the frame 20 constructed as described above, the portion substantially surrounded by the upper down frames 26L, 26R, the upper central frames 30L, 30R, the upper sub-frames 42L, 42R, the lower down frames 28L, 28R, the lower central frames 36L, 36R, the lower pivot frames 38L, 38R, and the upper arch frame 40 is defined as an equipment mounting region 60. Further, the portion substantially surrounded by the upper rear frames 52L, 52R and the lower rear frames 54L, 54R is defined as a tank supporting region 62.

In the equipment mounting region 60, there are provided the fuel cell 12, a VCU (Voltage Control Unit) 64 for performing voltage adjustment, a water pump 66 for circulating coolant of the cooling system, an ion exchanger 68 for preventing a ground fault in the fuel cell 12 by removing ions in the cooling water, a supercharger (also referred to as "pump" or "compressor") 70 for compressing reactant gas (air), a humidifier 72 allowing moisture exchange between reactant gas supplied to the fuel cell 12 and the used reactant gas discharged from the fuel cell 12, a gas-liquid separator (catch tank) 74 for collecting moisture generated due to a predetermined expanding action or the like within excess hydrogen gas not used in the reaction, a dilution box 76 for diluting purged hydrogen gas with the used reactant gas, an airflow sensor 78 that detects the inflow air amount, and a thermostat 79 for switching the circulation path of the cooling water at the time of warming-up and supercooling.

The gas-liquid separator 74 collects the generated water in the excess hydrogen not used for the reaction in the fuel cell 12.

Figure 6:
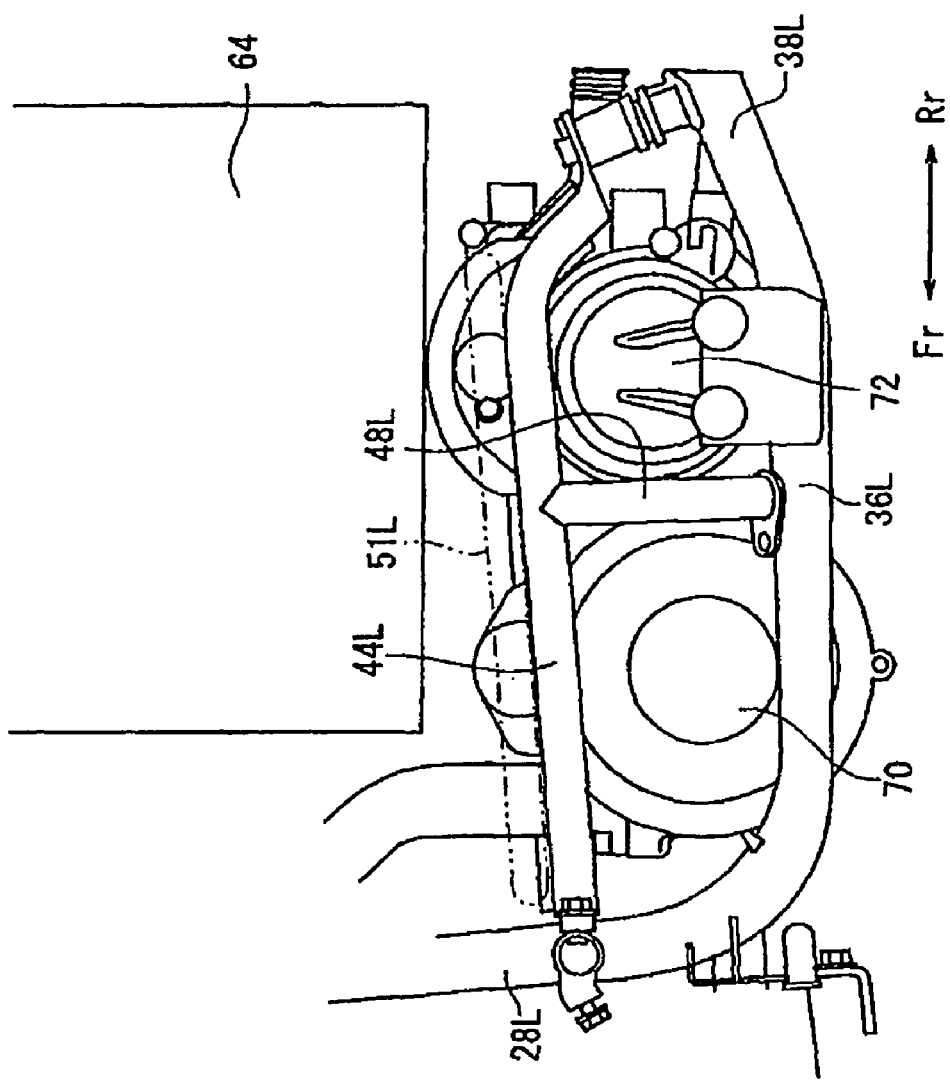
FIG. 6 is an enlarged side view of a lower portion of an equipment-mounting region.

As shown in FIG. 6, the supercharger 70 and the humidifier 72 are partially located below the stepping plates 51L, 51R. Since the supercharger 70 and the humidifier 72 are relatively heavy equipment in the equipment mounting region 60, their provision below the stepping plates 51L, 51R lowers the center of gravity of the fuel cell motorcycle 10 for improved running stability. Further, an improvement is achieved in terms of the freedom of design without the configuration or width of the stepping plates 51L, 51R being affected by the supercharger 70 and the humidifier 72, making the cooling system particularly suitable for use in a scooter-type fuel cell motorcycle.

Further, the supercharger 70 is provided in the airway for a cooling fan 109b that will be described later (see FIGS. 1 and 2), thus promoting the air cooling effect with respect to the supercharger 70. Likewise, the water pump is provided in the airway for a cooling fan 109a that will be described later, thus promoting the air cooling effect with respect to a water-pump driving motor.

The supercharger 70 has a motor 70a that rotates under the action of an ECU 92. The motor 70a rotates as indicated by the arrow B in FIG. 2 in the side view plane, and the rotation direction of the motor 70a is set as the same direction (counterclockwise direction in FIG. 2) as the rotation direction (arrow C) of the front wheel 14 and rear wheel 16. Accordingly, the gyroscopic effect of the rotation of the motor 70a is added to the gyroscopic effect of the rotations of the front wheel 14 and rear wheel 16, thereby achieving an improvement in running stability. Further, there is no fear of a moment that tilts the fuel cell motorcycle 10 to the right or left being generated even when the rotational speed of the motor 70a changes. In this case, the rotation direction of the motor 70a may be reverse to the rotation direction of the front wheel 14 and rear wheel 16.

Returning to FIGS. 1 and 2, the fuel cell 12 is provided in a portion located in the rear of the equipment mounting region 60 and whose lateral sides are surrounded by the upper pivot frames 32L, 32R and the upper arch frame 40. Further, the fuel cell 12 is arranged so as to be inclined rearward so that an inclination angle θ (see FIG. 13) formed between its longitudinal surface 12e and the horizontal plane becomes approximately 70°, the longitudinal surface 12e being oriented in the substantially vertical direction. It should be noted here that the longitudinal surface 12e refers to the surface on the longitudinal side longer than an upper surface 12a and a lower surface 12b in side view without regard to the depth direction (lateral direction).

Figure 2:
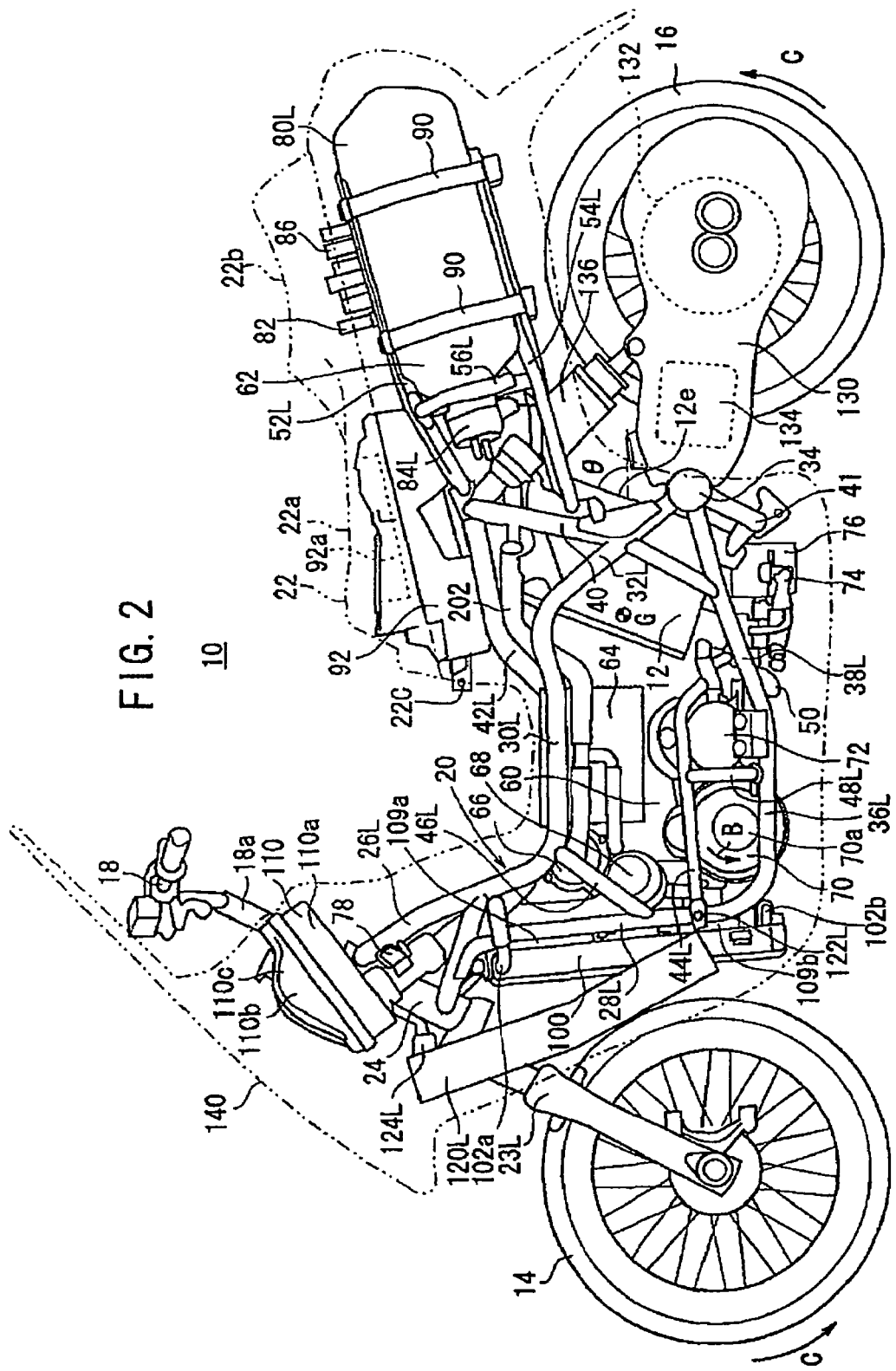
FIG. 2 is a left-hand side view of the fuel cell vehicle.
Figure 3:
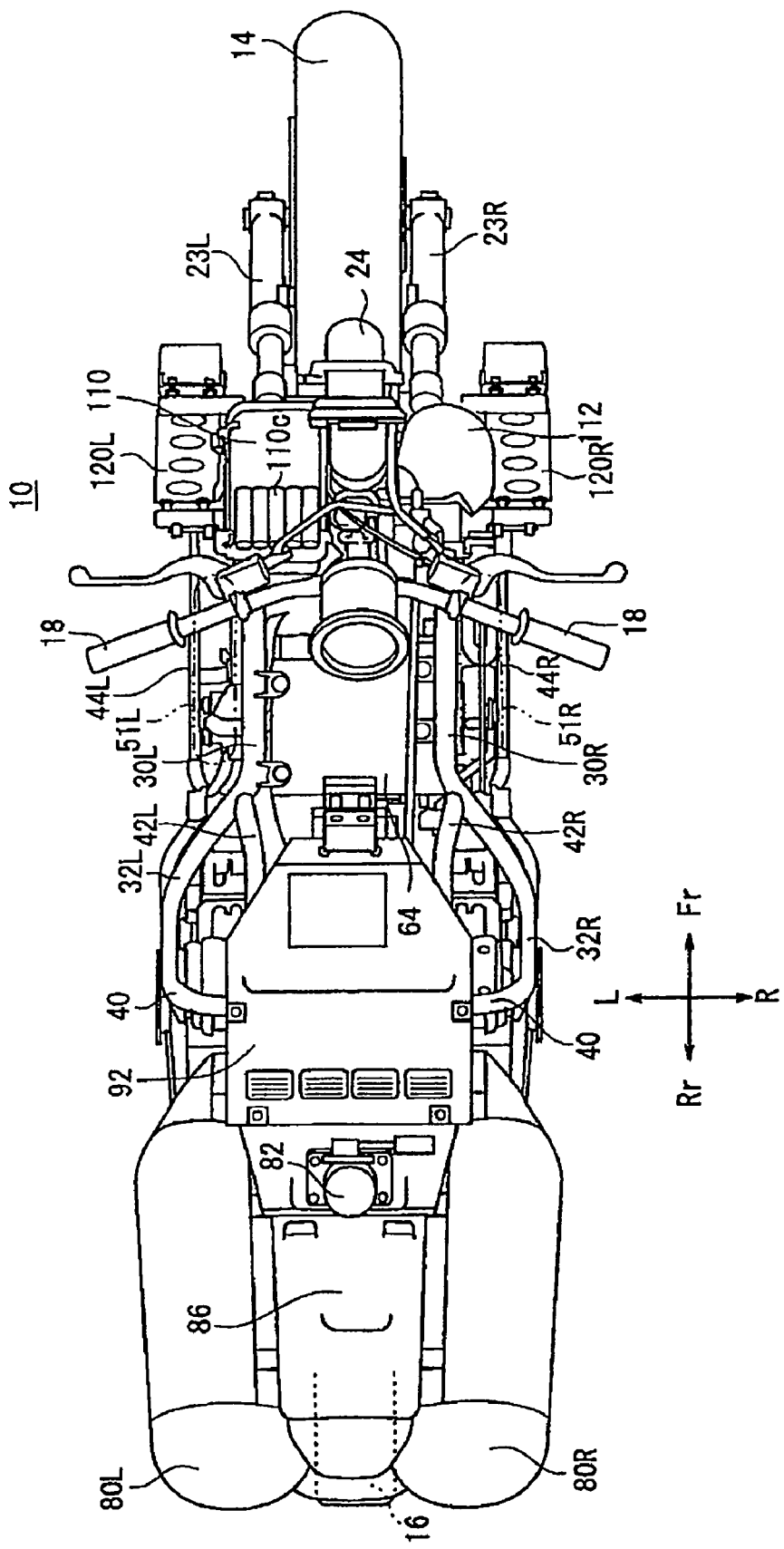
FIG. 3 is a plan view of the fuel cell vehicle.

Further, as can be appreciated from FIGS. 1 and 2, the fuel cell 12 is arranged under the seat 22, and more specifically under the front portion 22a on which the rider sits.

Figure 13:
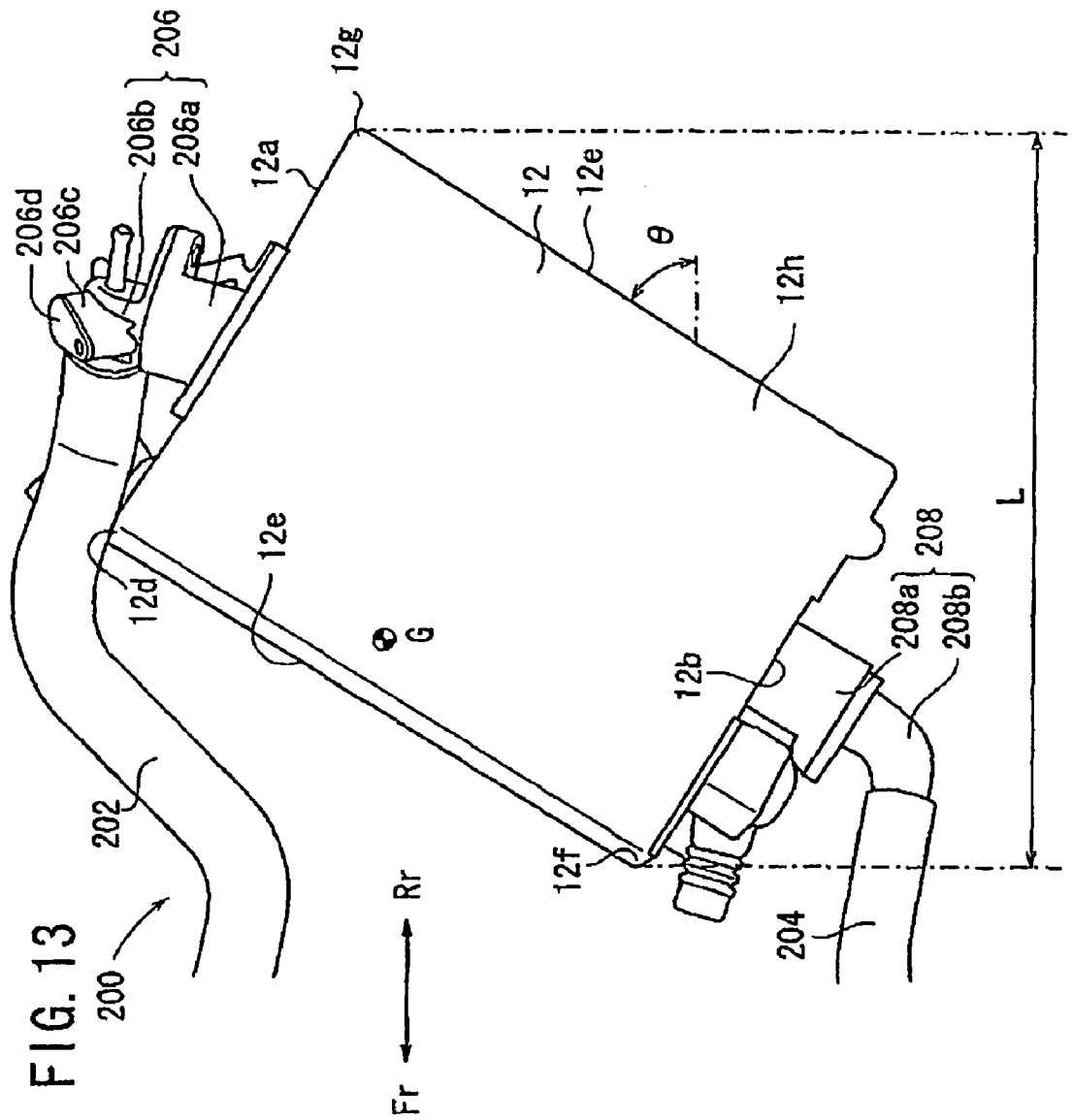
FIG. 13 is a side view of a fuel cell.

By thus arranging the heavy fuel cell 12 under the front portion 22a of the sear 22 on which the rider sits, as shown in FIG. 13, the center of gravity G of the fuel cell motorcycle 10 as a whole is set to be present within the width L of the fuel cell 12 with respect to the vehicle length direction. Further, since the longitudinal surface 12e is arranged so as to be oriented substantially vertically as seen in side view, an end 12f of the fuel cell 12 in the vehicle length direction is also arranged at a position near the center of gravity G, so the weight is concentrated near the center of gravity G. Improved maneuverability can be thus achieved in terms of turning or banking of the fuel cell motorcycle 10. Further, since the rider sits on the front portion 22a, the rider performs driving near the fuel cell 12, thus allowing the rider to enjoy a driving feel that provides a sense of unity with the vehicle.

It should be noted that the position of the center of gravity G in the longitudinal direction of the vehicle can be determined from the ratio between the loads on the front wheel 14 and the rear wheel 16. The center of gravity G may be one corresponding to the vehicle dry weight with no coolant or fuel filled in the vehicle or may be one corresponding to the operating weight with the coolant or fuel filled in the vehicle.

Further, since the longitudinal surface 12e of the fuel cell 12 is arranged so as to be inclined rearward, the longitudinal surface 12e is arranged along the upper arch frame 40 similarly inclined rearward, thus allowing easy fixation. Further, due to its rearward inclination, the fuel cell 12 is arranged so to be opposed to the rear wheel 16. This allows a good balance in layout and efficient use of the space within the equipment mounting region 60. Further, due to the rearward inclination, a suitable space that does not interfere with the rocking motion of a swing arm 130 and is not unnecessarily large is secured on the rear side portion of the fuel cell 12.

In order to arrange the fuel cell 12 under the front portion 22a of the seat 22 and in an appropriate orientation allowing the fuel cell 12 to be opposed to the rear wheel 16, the fuel cell 12 may be arranged in a rearwardly inclined or upright orientation so that the inclination angle θ (see FIG. 13) formed between the longitudinal surface 12e and the horizontal plane becomes 45° to 90°.

Now, returning to FIGS. 1 and 2, the VCU 64 has a somewhat flat box-like configuration and is provided in a portion located in the upper central portion of the equipment mounting region 60 and whose lateral sides are surrounded by the upper central frames 30L, 30R. The water pump 66 and the ion exchanger 68 are provided in a portion located slightly in front of the VCU 64 and whose lateral sides are surrounded by the front sub-frames 46L, 46R. The water pump 66 is provided above the ion exchanger 68.

Figure 7:
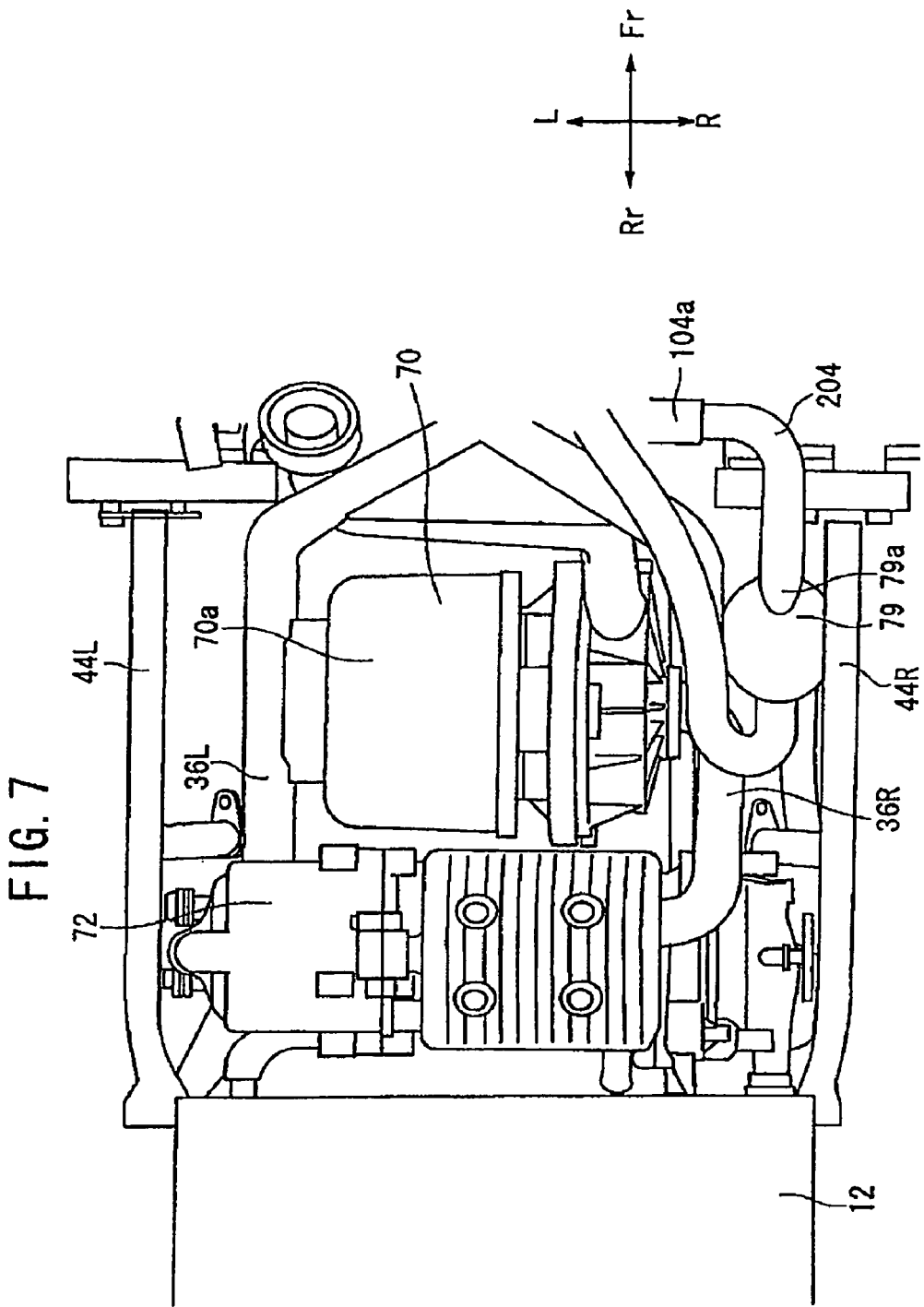
FIG. 7 is an enlarged plan view of the lower portion of the equipment-mounting region.
Figure 8:
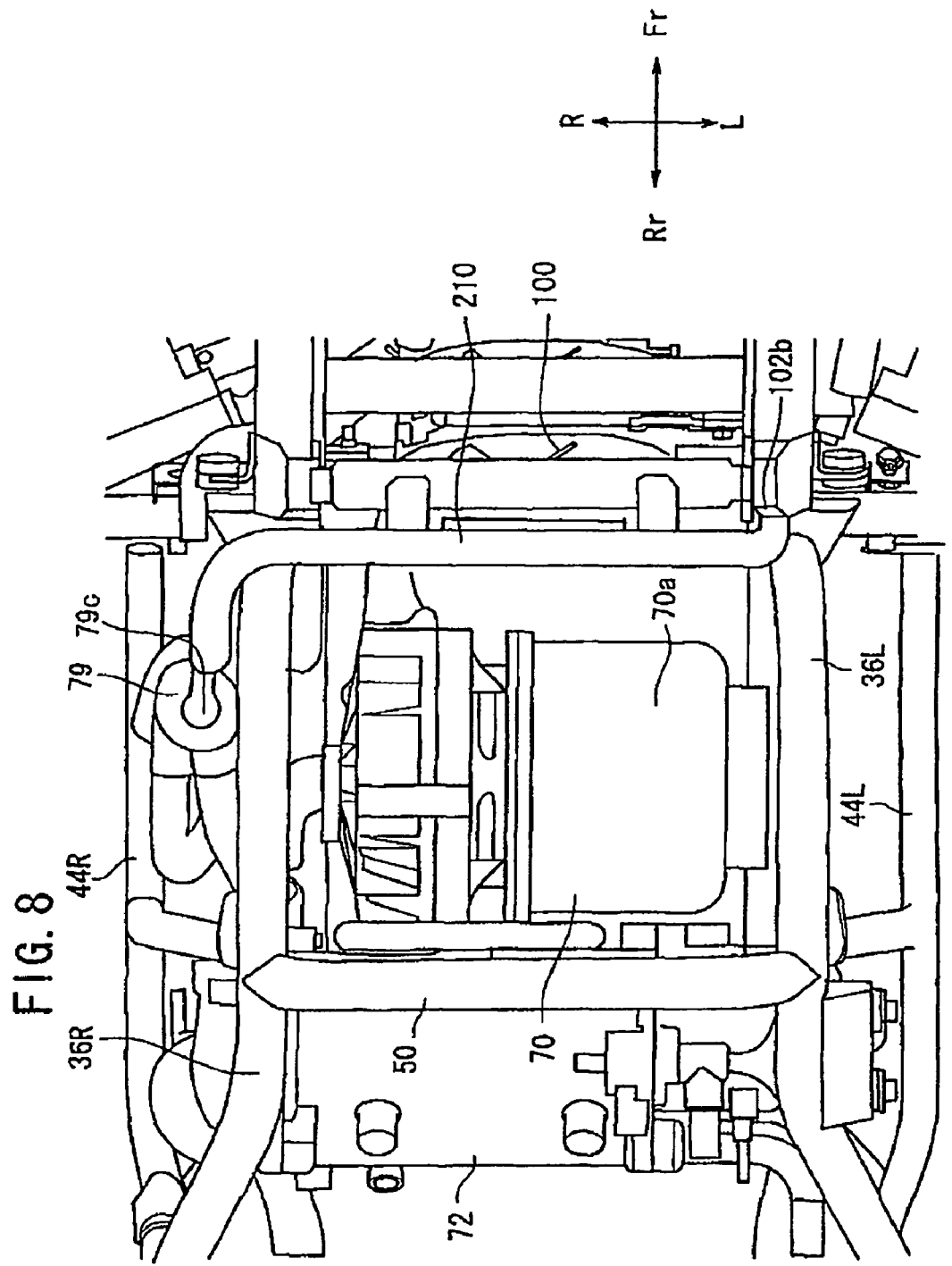
FIG. 8 is an enlarged bottom view of the lower portion of the equipment-mounting region.

As shown in FIGS. 6, 7, and 8, the supercharger 70, the thermostat 79, and the humidifier 72 are provided in a potion located below the VCU 64 and whose lateral sides are surrounded by the lower central frames 36L, 36R and the side frames 44L, 44R. The supercharger 70 and the thermostat 79 are provided in front of the humidifier 72. As shown in FIG. 8 (bottom view), the humidifier 72 is arranged over a width substantially the same as the width between the lower central frame 36L and the lower central frame 36R. The width of the supercharger 70 is slightly smaller than the width between the lower central frame 36L and the lower central frame 36R. The thermostat 79 is arranged on the right-hand side (the upper side in FIG. 8) of the supercharger 70.

The gas-liquid separator 74 and the dilution box 76 are provided below the fuel cell 12. The gas-liquid separator 74 is provided on the left side with respect to the dilution box 76 (see FIG. 17). It should be noted that although not shown, the gas-liquid separator 74 may be provided on the front side of the vehicle with respect to the dilution box 76.

Figure 16:
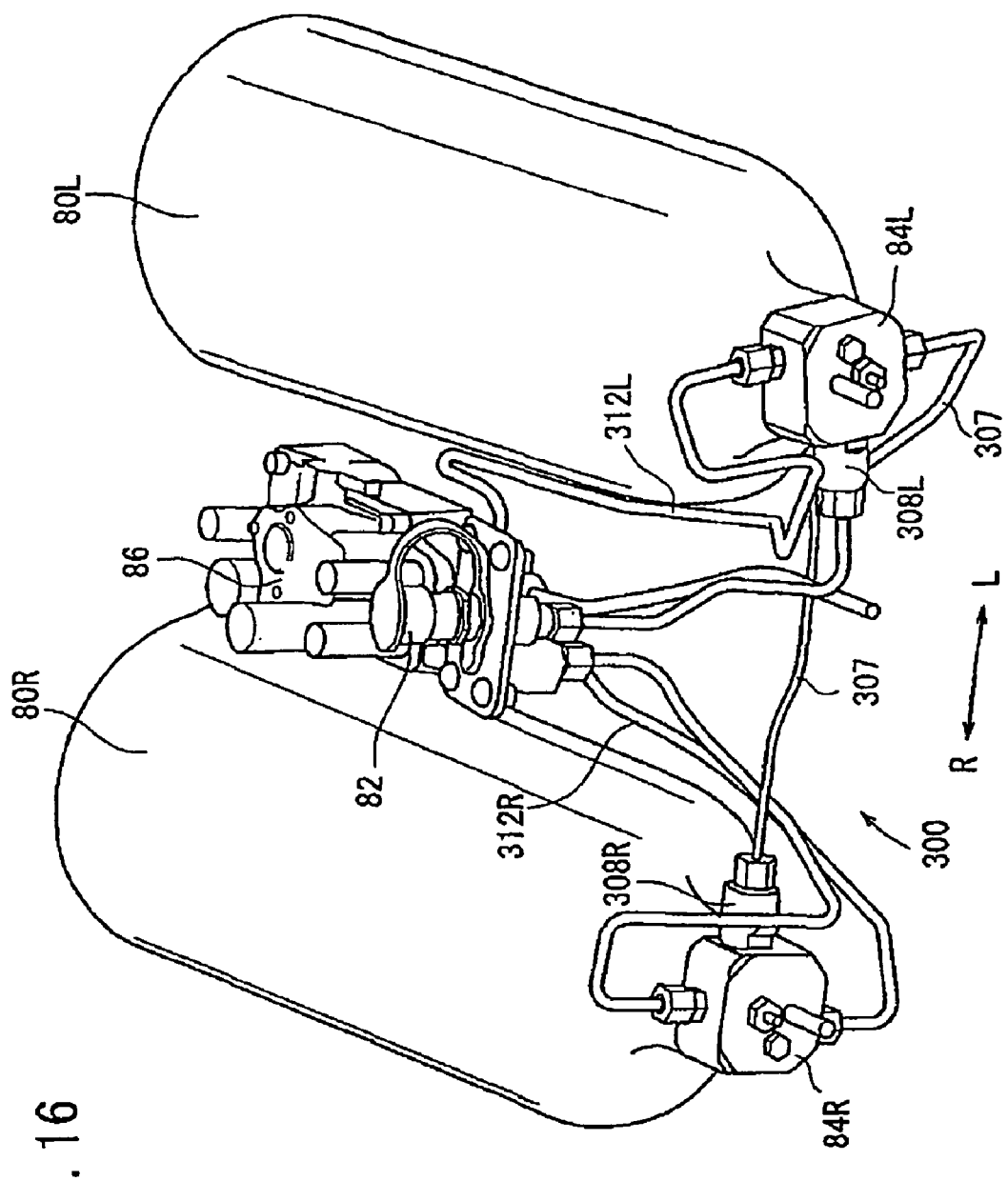
FIG. 16 is an actual layout view showing a circuit of the hydrogen system around fuel cylinders.

Provided in the tank supporting region 62 are a pair of left and right fuel cylinders 80L, 80R storing the hydrogen gas supplied to the fuel cell 12 in a high pressure state, a fuel fill port 82 for supplying hydrogen gas to the fuel cylinders 80L, 80R, and in-tank electromagnetic valves 84L, 84R provided to the respective fuel cylinders 80L, 80R, with a pressure regulating unit 86 and the fuel fill port 82 being provided at the central portion (see FIG. 16).

The fuel cylinders 80L, 80R each have a cylindrical configuration that is semispherical at the ends, and are provided at positions offset with respect to the center in the rear portion of the vehicle body. Specifically, as seen in top view (see FIG. 3), the fuel cylinders 80L, 80R extend in the vehicle length direction, and in side view (see FIG. 1), the fuel cylinders 80L, 80R are arranged so as to be inclined upwardly rearward along the seat 22. The upper rear frame 52L and the lower rear frame 54L extend substantially along the upper end edge and lower end edge of the fuel cylinder 80L, respectively. The fuel cylinder 80L is supported by two bands 90 that are fixed to the upper rear frame 52L and the lower rear frame 54L at both ends. Likewise, the upper rear frame 52R and the lower rear frame 54R extend substantially along the upper end edge and lower end edge of the fuel cylinder 80R, respectively. The fuel cylinder 80R is supported by the two bands 90 that are fixed to the upper rear frame 52R and the lower rear frame 54R at both ends Of the parts constituting the fuel cell motorcycle 10, the fuel cylinders 80L, 80R are relatively large parts. However, since the fuel cylinders 80L, 80R are provided at positions laterally offset with respect to the centerline, there is almost no overlap of the fuel cylinders 80L, 80R with the rear wheel 16 as seen in top view, thereby making it possible to secure a sufficient vertical suspension stroke for the rear wheel 16. This makes it easier to mitigate the impact from the road surface, thereby achieving an improvement in the riding comfort of the fuel cell motorcycle 10.

The fuel fill port 82 is provided at a position intermediate between substantially front-end portions of the left and right fuel cylinders 80L, 80R and below the seat 22, and is oriented upward (see FIG. 16). The ECU (Electric Control Unit) 92 for performing centralized control of the fuel cell motorcycle 10 is provided below the seat 22. The ECU 92 also performs control of the fuel cell 12. The fuel fill port 82 and the ECU 92 are arranged so that their upper and side surfaces are covered by the seat 22. When the seat 22 is opened about a hinge 22c in the front of the seat 22, the fuel fill port 82 and the ECU 92 are exposed to allow filling of fuel or a predetermined maintenance operation. A recess 92a is formed in the upper surface of the ECU 92. The recess 92a may serve as a storage space.

A radiator 100 for cooling the fuel cell 12 is provided immediately in front of the lower down frames 28R, 28L. The radiator 100 has a plate-like configuration whose height is substantially twice its width (see FIG. 9). The radiator 100 is provided so that its both side portions extend along the lower down frames 28R, 28L. The radiator 100 includes a first tank 102 on the primary side to which cooling water heated in the fuel cell 12 is supplied via the water pump 66, a second tank 104 on the secondary side which discharges the cooling water cooled by heat radiation, and a cooling portion 106 provided between the first tank 102 and the second tank 104 and performing heat exchange with the outside air. The first tank 102 and the second tank 104 are provided on the left-hand side and right-hand side of the cooling portion, respectively.

Figure 9:
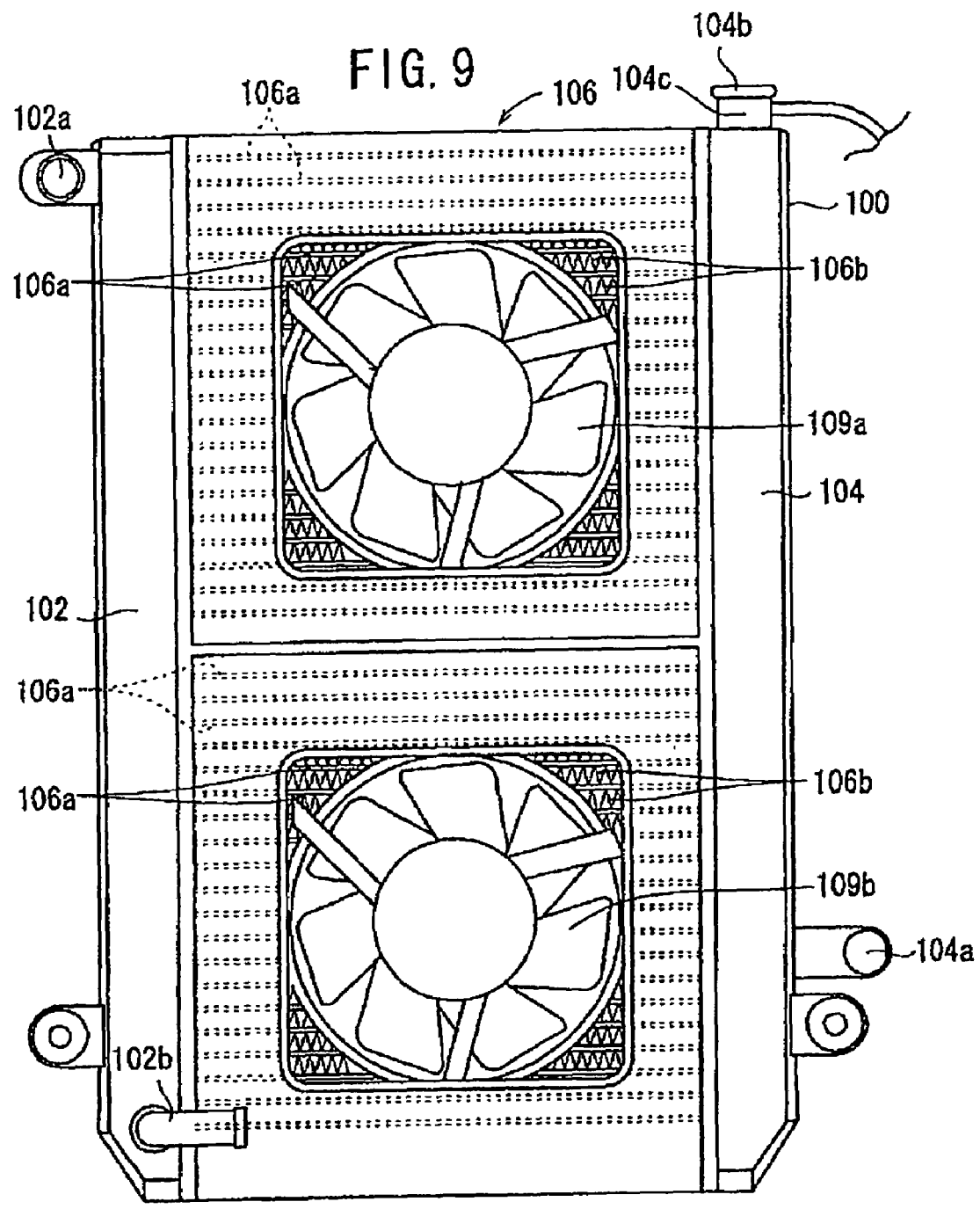
FIG. 9 is a rear view of a radiator.

As shown in FIG. 9, the first tank 102 and the second tank 104 are of an elongated configuration extending from the upper end to the lower end on the left and right side portions of the radiator 100. A first exhaust port 104a for exhausting cooling water cooled by heat radiation is provided in a portion of the second tank 104 slightly above the lower end thereof, and a radiator cap 104b and a refill port 104c that is connected to a reservoir tank 112 are provided at the upper end of the second tank 104. The radiator cap 104b serves to keep the internal pressure of the cooling system 200 (see FIG. 12) constant; upon pressure increase, a valve inside the radiator cap 104b is opened to release excess coolant or entrained air from the refill port 104c into the reservoir tank 112, and when the pressure is low, the deficit amount of coolant is refilled from the reservoir tank 112. The reservoir tank 112 is arranged above the radiator cap 104b.

An introduction port 102a for introducing humidified cooling water is provided at substantially the upper end of the first tank 102, and a second exhaust port 102b connected to the thermostat 79 is provided at substantially the lower end of the first tank 102.

The cooling portion 106 includes a number of narrow tubes 106a communicating between the first tank 102 and the second tank 104, and cooling fins 106b of a corrugated configuration in plan view provided between the narrow tubes 106a. In the cooling portion, coolant passing through the narrow tubes 106a is cooled by heat radiation from the cooling fins 106b. Further, the cooling fins 106b provide a high cooling effect as they readily allow flow of air and have a large surface area.

The cooling fan 109a and the cooling fan 109b are provided in upper and lower portions of the back surface of the radiator 100, respectively. The air sucking action of the cooling fans 109a, 109b facilitates flow of air through the cooling fins 106b, thereby achieving an improvement in the effect of heat radiation by the radiator 100.

Figure 5:
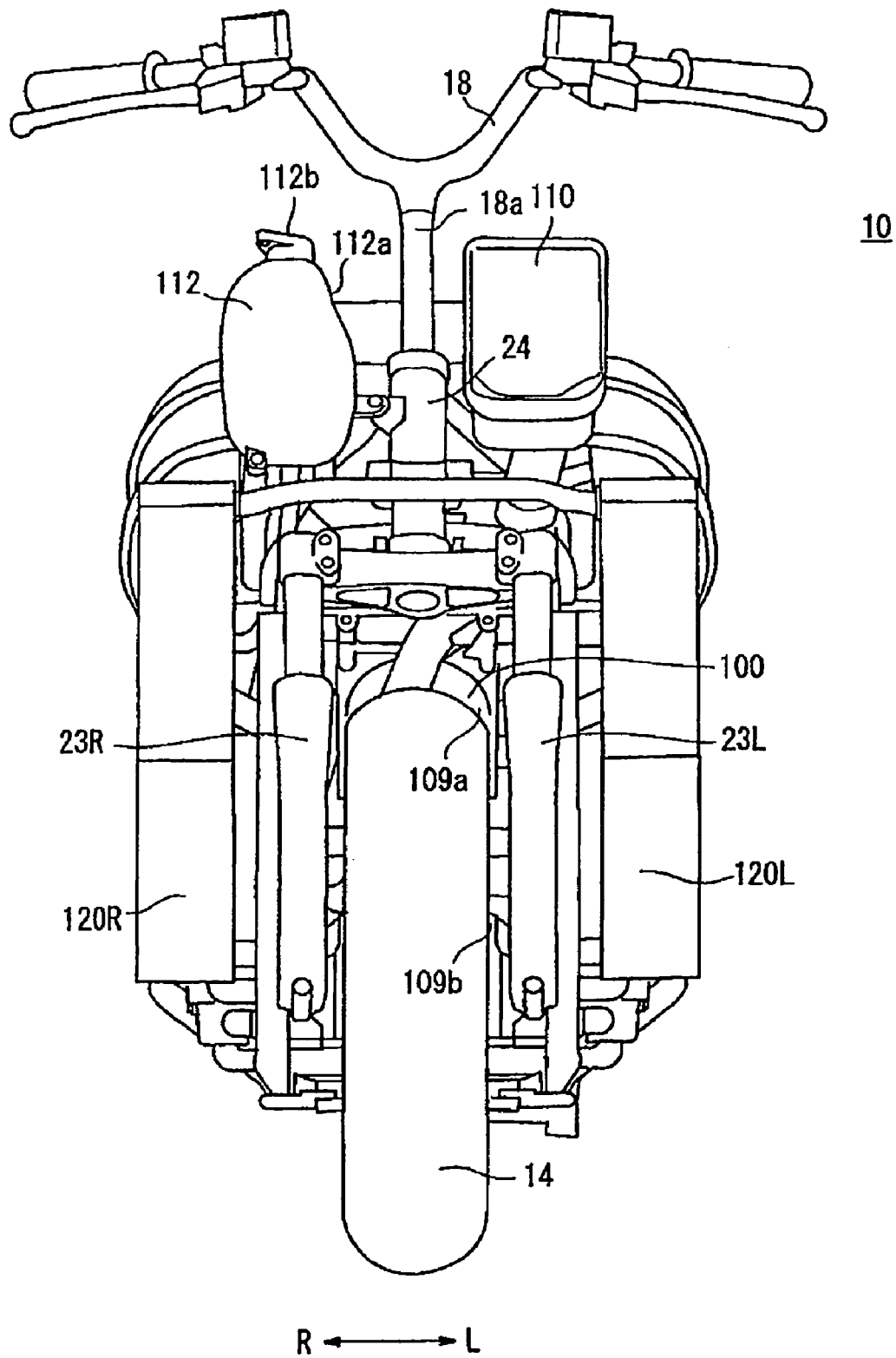
FIG. 5 is a front view of the fuel cell vehicle.

As shown in FIG. 5, the handlebar 18 is connected to the upper portions of the front suspensions 23L, 23R via the head pipe 24. The handlebar 18 has a substantially T-shaped configuration. An air clear 110 for taking in outside air, and the reservoir tank 112 for replenishing the radiator 100 with coolant are provided on the left-hand side and on the right-hand side, respectively, of a support shaft portion 18a of the handlebar 18 whose lower end is inserted in the head pipe 24. The air cleaner 110 and the reservoir tank 112 are arranged in a well-balanced manner at substantially symmetrical positions with respect to the support shaft portion 18a and fixed to a part of the frame 20.

Figure 10:
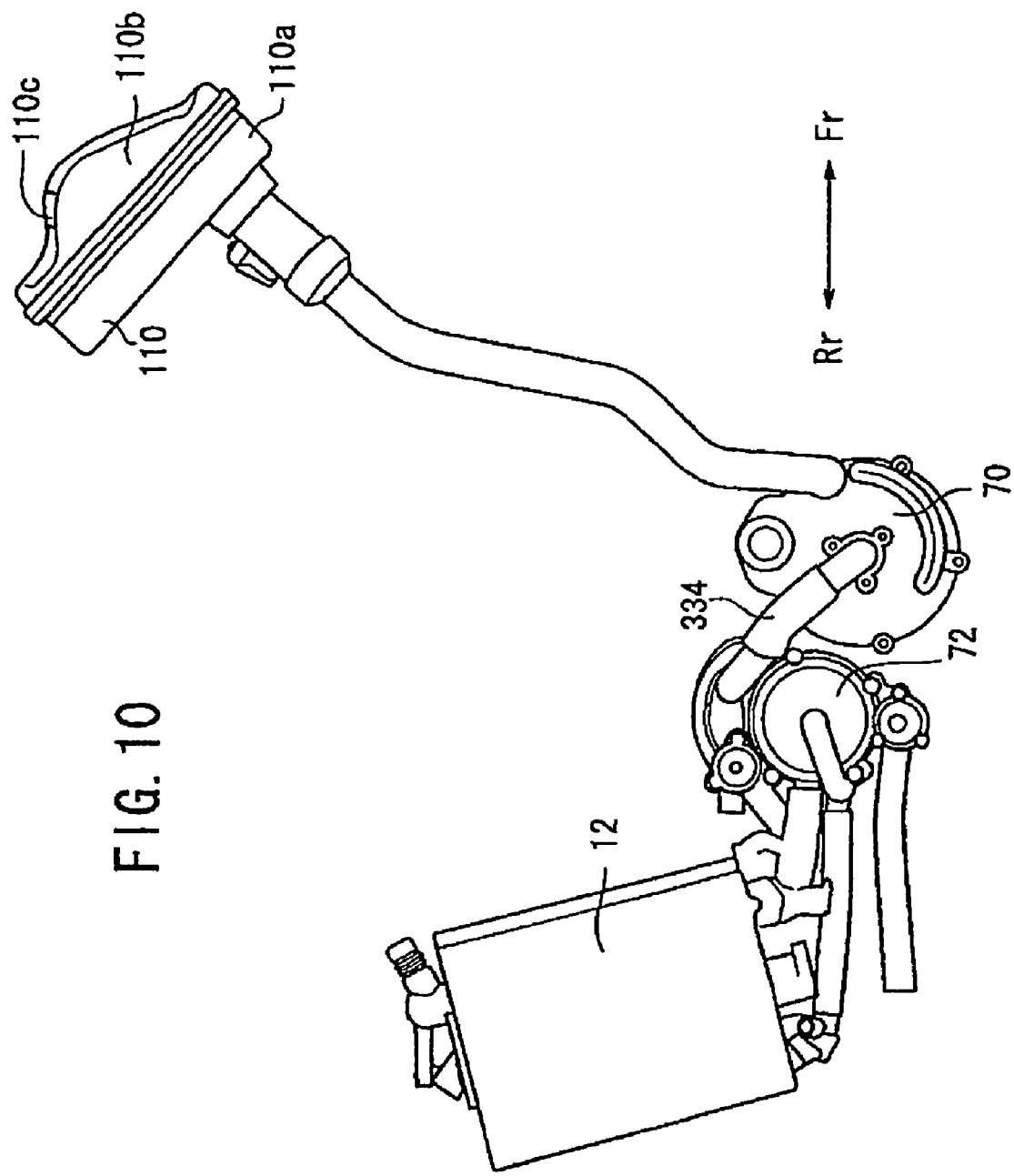
FIG. 10 is an actual layout view showing the connection between an air cleaner, a supercharger, a humidifier, and a fuel cell.
Figure 11:
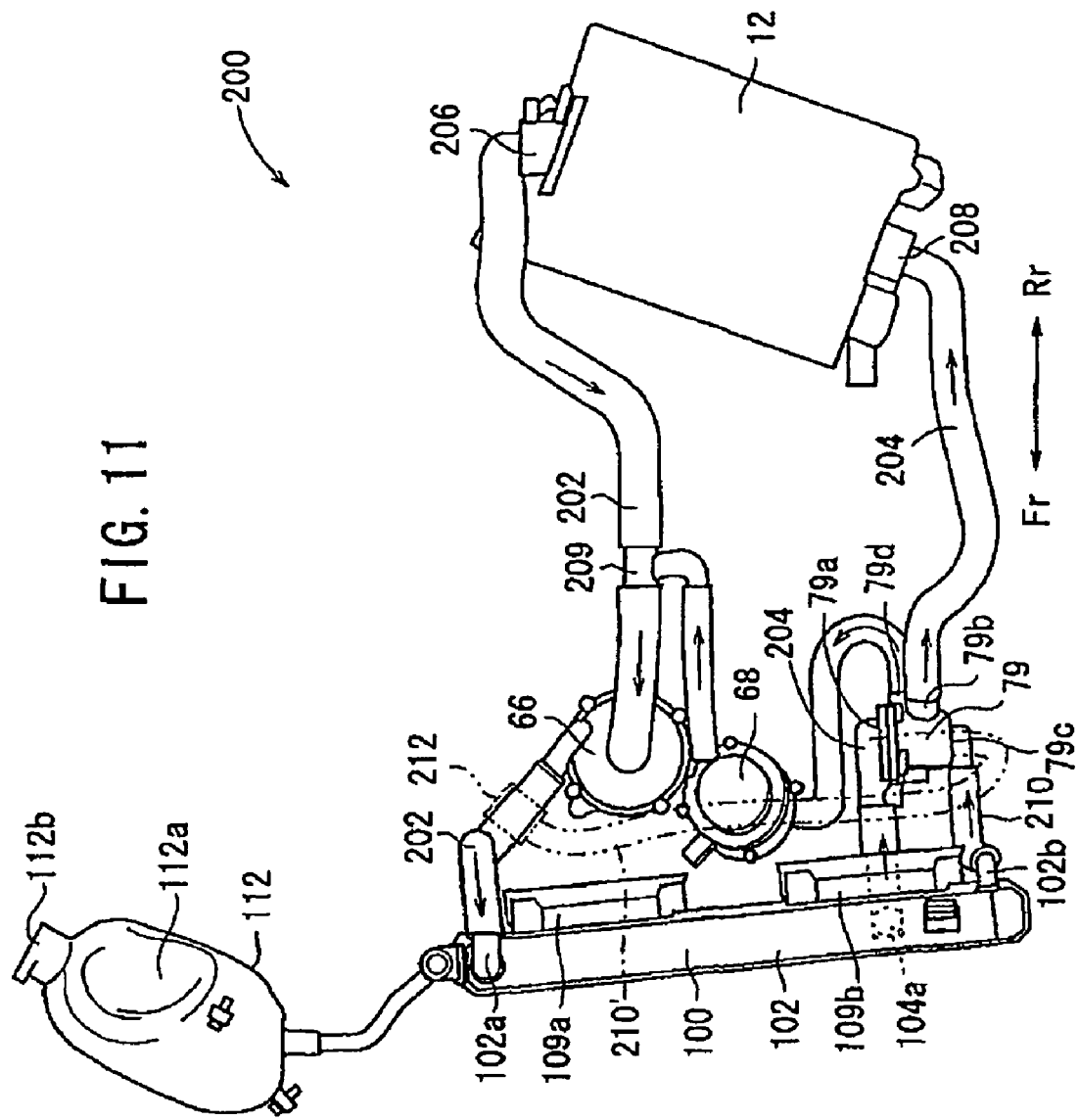
FIG. 11 is an actual layout view showing a circuit of a cooling system.

As shown in FIG. 10, the air cleaner 110 includes a square bottom portion 110a and a lid portion 110b covering the upper surface of the bottom portion 110a. The lower surface of the bottom portion 110a is set to be oriented in the diagonally downward and rearward direction. The lid member 110b is bulged at the central portion, and an air supply port 110c is provided in an upper portion of the bulged portion. A filter for purification of sucked air is provided in the air cleaner 10. Replacement of the filter can be performed by detaching the lid portion 110b. As shown in FIG. 11, the reservoir tank 112 has a substantially prolate configuration with a recess 112a provided in a part thereof. Like the support shaft portion 18a, the reservoir tank 112 is placed so as to be directed upward and slightly rearward, with a cooling water supply port 112b at the top being oriented upward.

As shown in FIGS. 1, 2, and 5, a pair of secondary batteries 28L, 28R are provided between the front wheel 14 and the lower down frames 28L, 28R and located outside the radiator 100. The secondary batteries 120L, 120R have a vertically elongated, substantially rectangular column-like configuration, and are gently bent at the intermediate height portion so that it projects slightly forward. Due to this configuration, by arranging a predetermined plate on a lower back surface of each of the secondary batteries 120L, 120R, this portion of the secondary batteries 120L, 120R can serve as a footrest portion on which the rider rests his/her feet during driving.

Further, the secondary batteries 120L, 120R are arranged so as to extend diagonally forward from the vicinity of the front ends of the side frames 44L, 44R, respectively. The lower ends of the secondary batteries 120L, 120R are connected to the lower down frames 28L, 28R by stays 122L, 122R, and the upper ends of the secondary batteries 120L, 120R are connected to the head pipe 24 by stays 124L, 124R, respectively. When the secondary batteries 120L, 120R are provided to the lower down frames 28L, 28R in this way, the loads acting on the front wheel 14 and the rear wheel 16 become equal, thereby improving the weight balance during driving. The secondary batteries 120L, 120R are of the same function and equally share one half of the current to be charged/discharged.

The front wheel 14 is rotatably supported on the lower ends of the front suspensions 23L, 23R. The rear wheel 16 is supported on the swing arm 130 rotatable about the pivot 34, and is provided with an in-wheel motor 132 and a motor driver 134 for driving the in-wheel motor 132. A rear suspension 136 is provided between an upper portion of the upper arch frame 40 and an upper left-side surface of the swing arm 130. The in-wheel motor 132 and the motor driver 134 are of a water cooling type and provide high efficiency and high output.

Further, as is apparent from FIGS. 1 and 2, the front portion of the seat 22 is deeply recessed downward the fuel cell motorcycle 10 can be classified as a scooter-type motorcycle. Substantially the entire fuel cell motorcycle 10 is covered by the fairing 140 as indicated by the imaginary lines.

In the fuel cell motorcycle 10 constructed as described above, at start-up, electric power is supplied to the in-wheel motor 132 or a predetermined motor or the like from the secondary batteries 120L, 120R for warming-up. After the warming-up, electric power generated by the fuel cell 12 is supplied to the in-wheel motor 132 to enable running of the motorcycle.

In cases such as when the throttle opening has increased and a relatively small output increase is required, the outputs of the secondary batteries 120L, 120R are supplied to the in-wheel motor 132 in a superimposed manner with respect to the output of the fuel cell 12, thereby achieving high response. When a greater output increase is required in addition to supplying the outputs of the secondary batteries 120L, 120R in a superimposed manner, the output of the fuel cell 12 is increased to improve the follow-up property with respect to the throttle opening.

Next, the water-cooling type cooling system 200 for cooling the fuel cell 12 to keep it within an appropriate temperature range will be described with reference to FIGS. 11 to 14.

Figure 12:
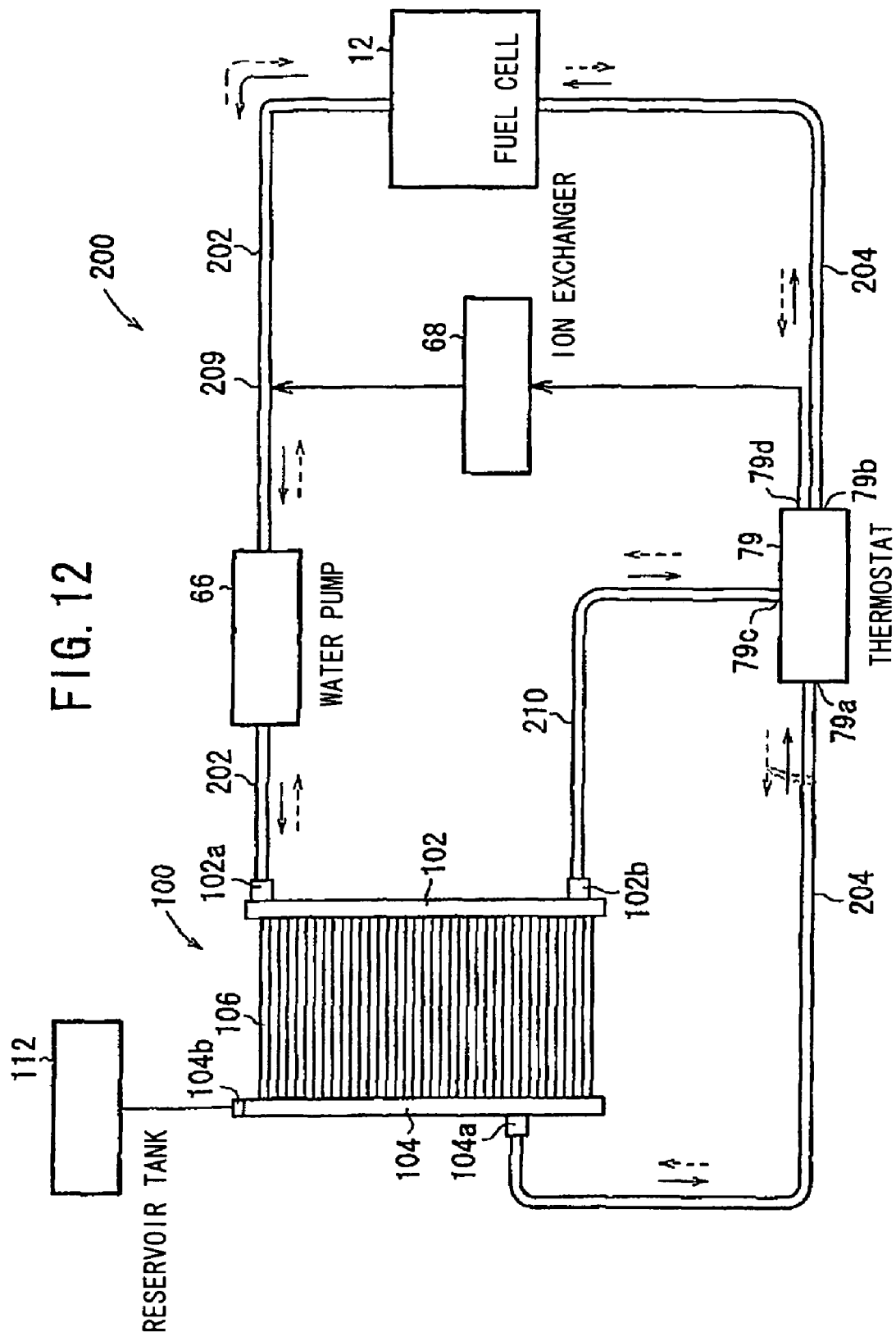
FIG. 12 is a block diagram of the cooling system.

As shown in FIGS. 11 and 12, the cooling system 200 has the water pump 66, the ion exchanger 68, the thermostat 79, the radiator 100, and the reservoir tank 112. The cooling system 200 basically supplies cooling water, which is heated by the fuel cell 12 as the heat source, to the radiator 100 through a first main pipe line 202, and supplies the cooling water cooled through heat radiation by the radiator 100 to the fuel cell 12 through a second main pipe line 204, thus circulating the cooling water. The water pump 66 is located midway through the first main pipe line 202 and serves to circulate the cooling water.

Figure 14:
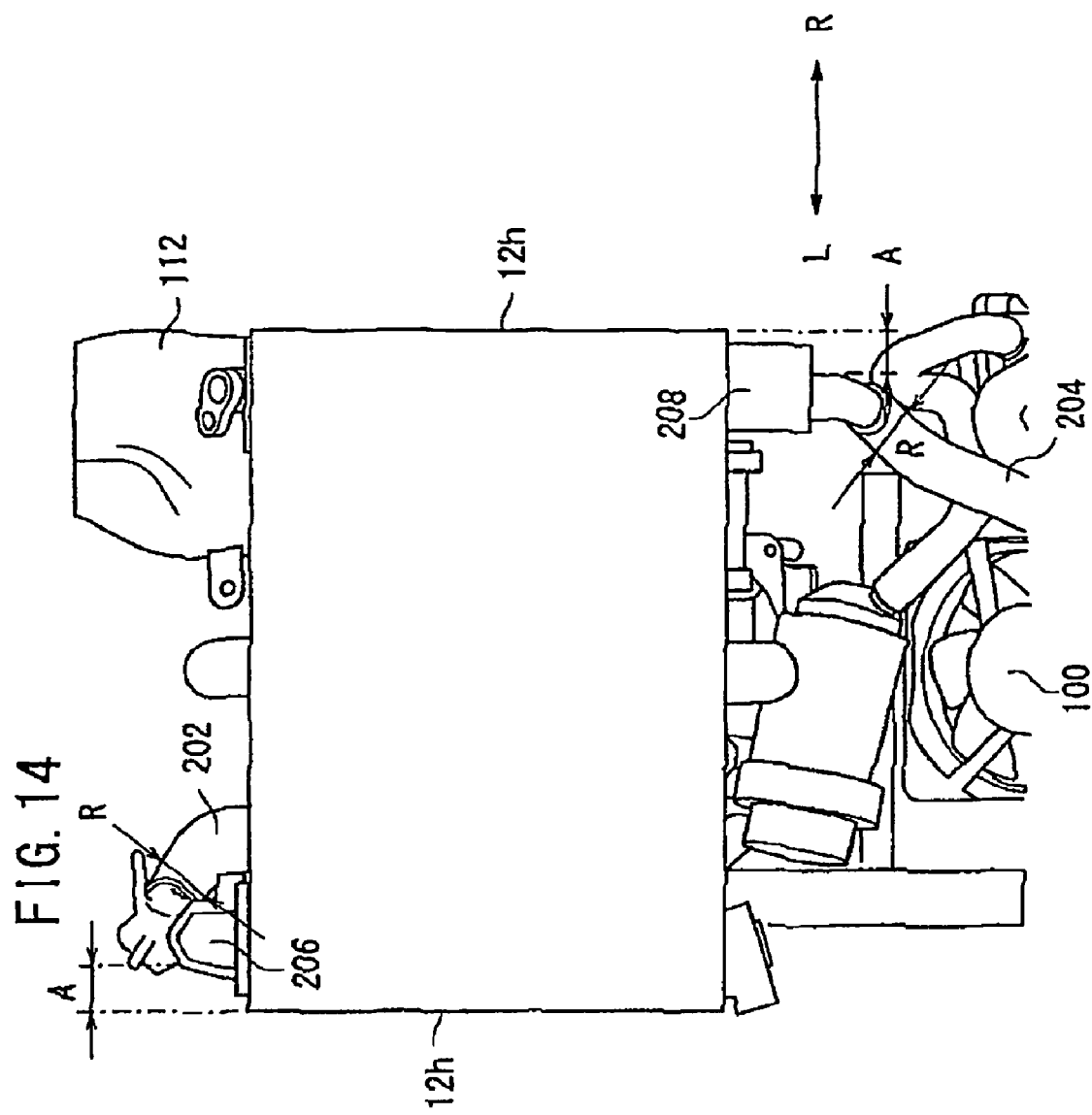
FIG. 14 is a view of the fuel cell as seen from diagonally below the back surface thereof.

As shown in FIGS. 13 and 14, one end of the first main pipe 202 is connected to the upper surface 12a of the fuel cell 12 via an upper joint (connecting portion) 206. One end of the second main pipe line 204 is connected to the lower surface 12b of the fuel cell 12 via a lower joint 208. The upper joint 206 is provided at the central portion of the upper surface 12a as seen in side view (see FIG. 13) and at substantially the left end of the upper surface 12a as seen in rear view (see FIG. 14). The lower joint 208 is provided at the central portion of the lower surface 12b as seen in side view (see FIG. 13) and at substantially the right end of the upper surface 12a as seen in rear view (see FIG. 14).

The upper joint 206 protrudes slightly upward and includes a lower portion 206a connected to the fuel cell 12 and an upper portion 206b connecting between the lower part 206a and the first main pipe line 202. The lower surface of the lower part 206a is tilted in conformity with the upper surface 12a of the fuel cell 12, and the upper surface of the lower part 206a is substantially horizontal. The upper surface of the lower portion 206a is set at substantially the same height as a front upper end 12d of the fuel cell 12.

The upper portion 206b is provided such that the internal flow path is bent at about 90° and that the first main pipe line 202 is oriented forward. Further, the upper portion 206b is provided with a short cylinder (air vent port) 206c communicating with the internal flow path, and a cover 206d covering the upper surface of the short cylinder 206c. The short cylinder 206c is arranged so as to extend diagonally upward from the bent part of the upper portion 206b. The cover 206d can be opened and closed with respect to the short cylinder 206c. The portion of the first main pipe line 202 from the upper portion 206b to the front upper end 12d extends substantially horizontally, and the portion thereof past the upper end 12d is tilted downwardly forward.

The lower joint 208 projects slightly downward, and includes a cylinder portion 208a perpendicular to the lower surface 12b and an elbow 208b connecting between the cylinder portion 208a and the second main pipe line 204. The second main pipe line 204 is arranged so as to extend forward from the elbow 208b.

Due to such connection of the first main pipe line 202 and the second main pipe line 204, the coolant is introduced into the fuel cell 12 from the first main pipe line 202 and is heated by cooling an internal power generation cell to be delivered from the second main pipe line 204. The coolant is thus allowed to circulate under the action of the water pump 66.

Further, since the first main pipe 202 is connected to the upper surface 12a of the fuel cell 12, air entering the fuel cell 12 floats upward and is thus smoothly discharged to the first main pipe 202 for efficient removal. This makes it possible to suppress a decrease in the efficiency of power generation by the fuel cell 12. The air discharged to the first main pipe 202 will be eventually discharged from the radiator cap 104b to the reservoir tank 112.

Further, since one end of the second main pipe line 204 is connected to the lower surface 12b of the fuel cell 12, when air enters the second main pipe line 204 as well, the air is discharged to the first main pipe line 202 via the fuel cell 12.

Further, as shown in FIG. 14, the first main pipe line 202 and the second main pipe line 204 are located on the outer sides of the upper surface 12a and lower surface 12b of the fuel cell 12 with respect to the vehicle width direction. A space is thus secured in the portion in front or in rear of the fuel cell 12, so the first main pipe line 202 and the second main pipe line 204 do not interfere with the layout of other equipment. This enables the placement of the VCU 64 in front of the fuel cell 12 (see FIGS. 1 and 2).

Although it is preferable to provide the first main pipe line 202 and the second main pipe line 204 on the outer sides in the vehicle width direction as much as possible, since the first main pipe line 202 and the second main pipe line 204 each have a predetermined diameter and are respectively connected via the upper joint 206 and the lower joint 208, it is necessary to leave some clearance A (see FIG. 14) with respect to an outer side surface 12h. Based on the radius R of the first main pipe line 202 and second main pipe line 204, the clearance A is preferably set as $R \leq A \leq 3R$. This allows the connection of the first main pipe line 202 and second main pipe line 204 to the fuel cell 12 to be effected without much trouble, and there is no fear of the first main pipe line 202 and the second main pipe line 204 projecting outward beyond the outer side surface 12h. Furthermore, a space is secured in the portion in front or in rear of the fuel cell 12.

The upper joint 206 as the connecting portion between the fuel cell 12 and the first main pipe line 202 is provided with the short cylinder 206c that can be opened and closed by the cover 206d, whereby air that has floated upward within the fuel cell 12 can be removed from the short cylinder 206c. That is, by opening the cover 206d by a suitable amount at the time of replacement of the coolant or the like, air entering the cooling system 200 can be quickly and efficiently removed.

Further, the portion of the first main pipe line 202 located in front of the front upper end 12d is tilted downwardly forward so that air contained in this portion also floats upward to be removed from the short cylinder 206c. Since the short cylinder 206c is provided at a locally elevated position, it is possible to prevent air from accumulating in the first main pipe line 202. It should be noted that the short cylinder 206c may also be used for introduction of cooling water.

As shown in FIGS. 11 and 12, the thermostat 79 is located midway through the second main pipe line 204. The thermostat 79 has four ports 79a, 79b, 79c, 79d, of which the ports 79a and 79b are connected to the second main pipe line 204. Normally, the ports 79a and 79b are communicated with each other so as to allow supply of cooling water cooled by the radiator 100 to the fuel cell 12. The port 79c is connected to the second exhaust port 102b of the first tank 102 via a bypass pipe line 210. The second exhaust port 102b is connected to the first main pipe line 202 via the first tank 102 and the introduction port 102a, and since there is no component serving as a throttle or a valve in the communication portion between these components, the circuit is equivalent to one in which the port 79c is directly communicated with the first main pipe line 202. Further, part of the cooling water is adapted to circulate by flowing from the port 79d through the ion exchanger 68 and connected to the first main pipe line 202 via the joint 209.

The thermostat 79 has the function of switching the communication path depending on the temperature of the coolant. During warming-up drive, the port 79a is shut off and the port 79c is opened, and the port 79c and the port 79b are communicated with each other. Accordingly, cooling water discharged from the water pump 66 passes through the introduction port 102a, the first tank 102, the second exhaust port 102b, and the bypass pipe line 210 and introduced from the port 79a to the thermostat 79 before being returned to the fuel cell 12 from the port 79b. Therefore, at the time of warming-up, cooling water is allowed to circulate without passing through the cooling portion 106, and the temperature can be thus quickly raised until the fuel cell 12 reaches a suitable temperature without the cooling water being unnecessarily cooled.

Figure 4:
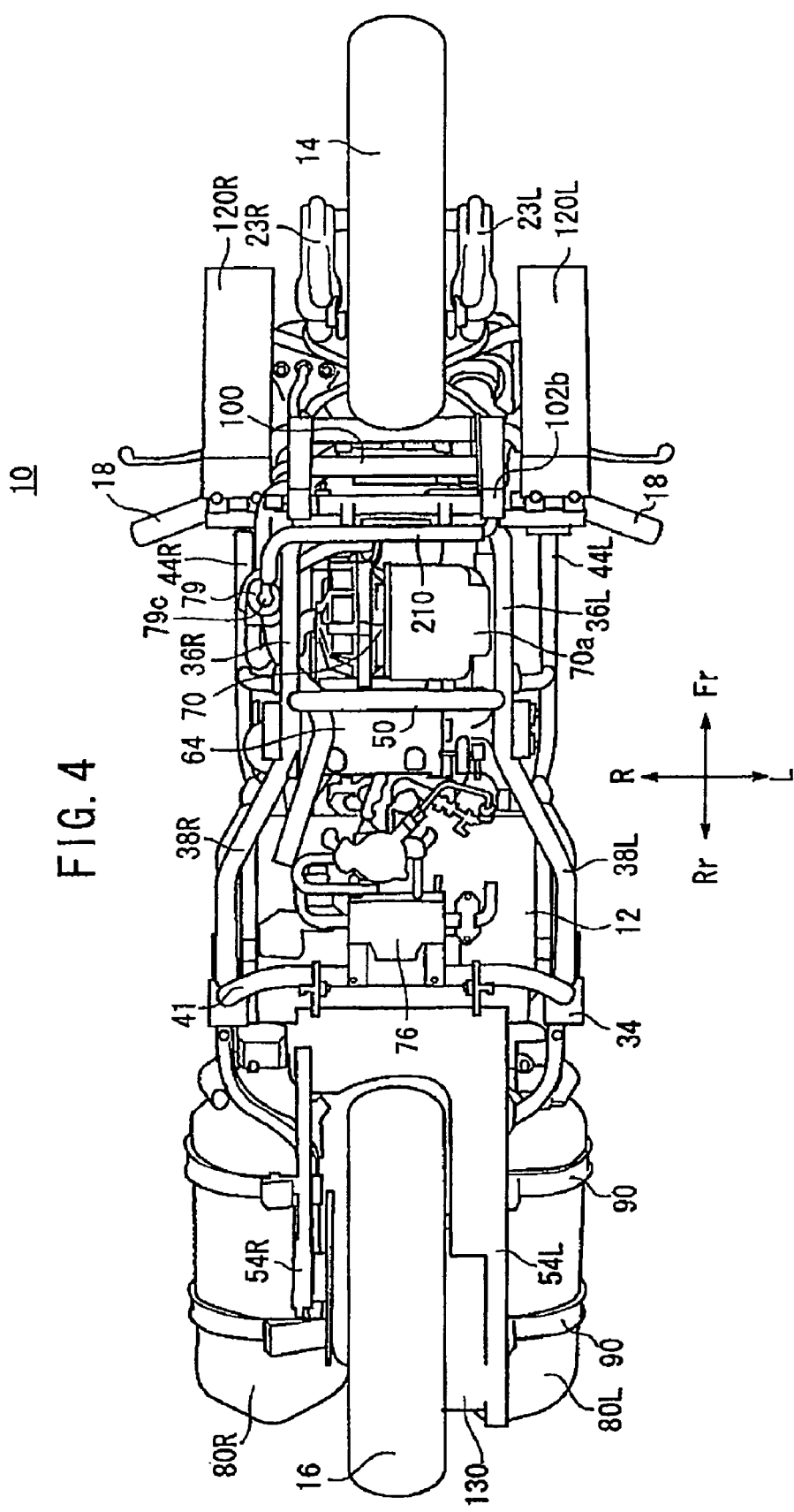
FIG. 4 is a bottom view of the fuel cell vehicle.

When the first tank 102 and the thermostat 79 are connected to each other by the bypass pipe line 210 as described above, this means that, as a circuit, the thermostat 79 is connected to the first main pipe line 202. That is, the first tank 102 serves as a part of the passage of the first main pipe line 202. The bypass pipe line 210 can be thus set as a short pipe line up to the first tank 102, thereby facilitating the pipe line routing and increasing the freedom of the layout of components. Specifically, as shown in FIGS. 4 and 8 (bottom view), the bypass pipe line 210 is arranged along the lower surface of the vehicle body, and its length is set to be short.

Assuming that the first tank 102 is not connected, as indicated by the imaginary line in FIG. 11, it is necessary to provide a branch joint 212 to the first main pipe line 202 and to form the bypass pipe line 210' so as to be vertically elongated and extend transversely, which places limitations on the layout of the supercharger 70, the ion exchanger 68, and the water pump 66. In contrast, this embodiment involves no such inconvenience because the bypass pipe line 210 is connected to a low position of the first tank 102.

Further, the first tank 102 has a vertically elongated configuration, and the first main pipe line 202 and the bypass pipe line 210 are connected on the opposite sides as seen from the center position in the elongated direction of the first tank 102, whereby the length of the first tank 102 is effectively utilized to arrange the first main pipe line 202 and the bypass pipe line 210 at a distance from each other, allowing a space to be secured therebetween to achieve a further increase in the freedom of layout.

It should be noted that examples of a selector valve connected to the first tank 102 via the bypass pipe line 210 are not limited to those which perform switching in response to the temperature of the coolant, such as the thermostat 79. For example, there may be used those which perform switching on the basis of a timer operation or predetermined computation result.

Further, the direction in which coolant circulates in the cooling system 200 may be reverse as indicated by the broken lines in FIG. 12. That is, coolant may be circulated such that the coolant heated by the fuel cell 12 is introduced from the port 79b into the thermostat 79, delivered to the first exhaust port 104a or the second exhaust port 102b (which in this case functions as an introduction port) by the switching action, and subjected to heat radiation in the radiator 100 or bypassed through the cooling portion 106 before being supplied from the introduction port 102a (which in this case functions as a delivery port) to the water pump 66. By rotating the water pump 66 in reverse, the cooling water is passed through the first main pipe line 202 to be returned to the fuel cell 12. In this way, a path extending from the bypass pipe line 210 and communicating with first main pipe line 202 via the first tank 102 is formed even when the circulating direction of the coolant is reverse, whereby, in the same manner as described above, the pipe line routing is facilitated and the freedom of the layout of components is increased.

In the cooling system 200, the heat source to be cooled by the radiator 100 is not limited to the fuel cell 12 but may be an internal combustion engine or a motor.

Next, a hydrogen system 300 for cooling the fuel cell 12 to supply hydrogen gas will be described with reference to FIGS. 15 to 17.

Figure 15:
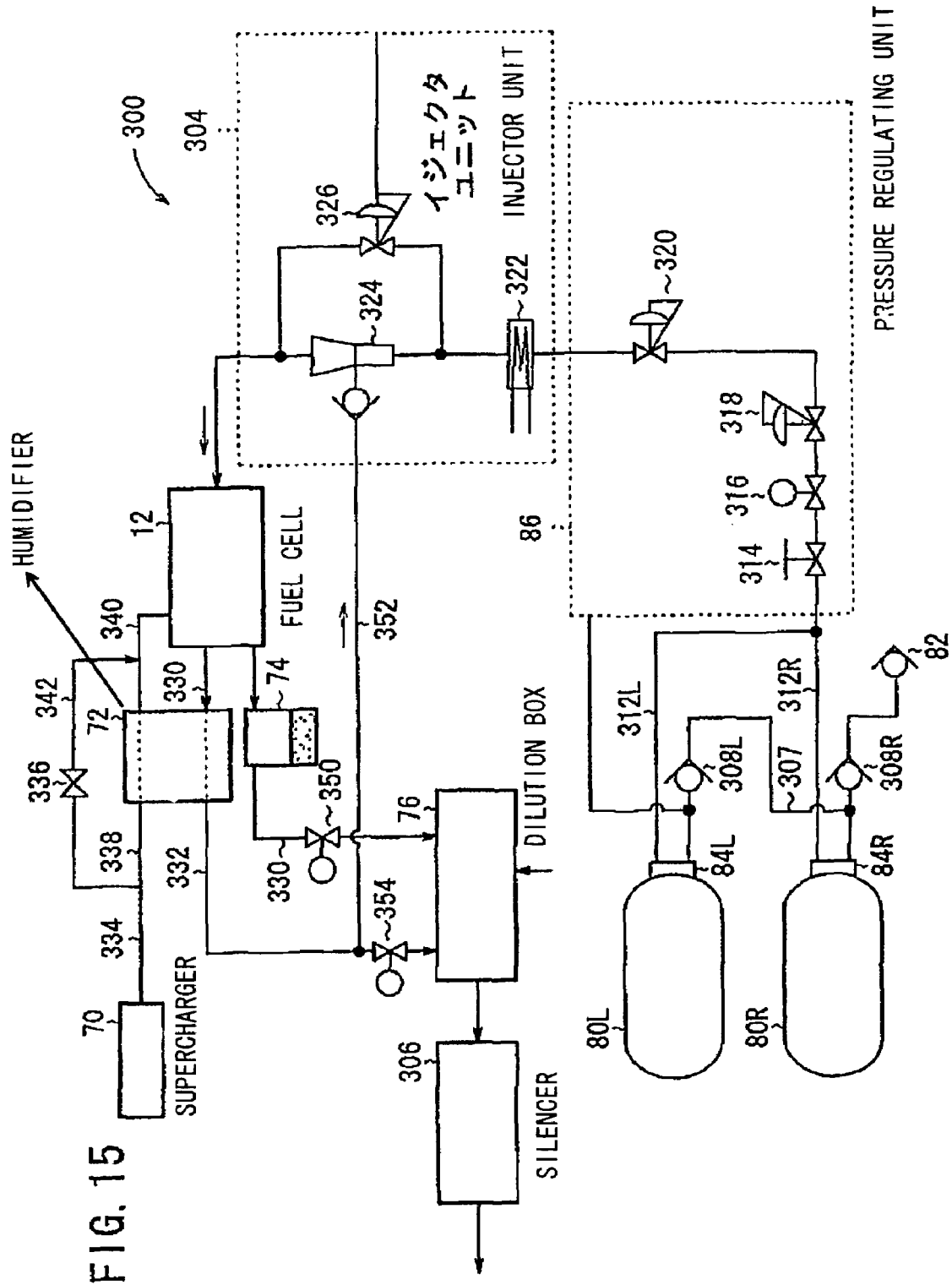
FIG. 15 is a block diagram of a hydrogen system.

As shown in FIG. 15, the hydrogen system 300 is a system including the fuel fill port 82, the fuel cylinders 80L, 80R, the pressure regulating unit 86, an injector unit 304, the gas-liquid separator 74, the dilution box 76, and a silencer 306, in which hydrogen gas is supplied to the fuel cell 12 and the reacted gas is circulated or exhausted.

As shown in FIGS. 15 and 16, hydrogen gas is filled at high pressure from the fuel fill port 82 via a check valve 308L and the in-tank electromagnetic valve 84L into the fuel cylinder 80L. Further, with respect to the fuel cylinder 80R, hydrogen gas is filled at high pressure from a pipe line 307, which is branched off from the secondary side of the check valve 308L, via a check valve 308R and the in-tank electromagnetic valve 84R into the fuel cylinder 80R on the right side at the same time. When the fuel cylinders 80L, 80R are placed under a high temperature or high pressure condition due to unexpected causes, the hydrogen gas inside the bombs is exhausted through exhaust pipes 312L, 312R.

In the pressure regulating unit 86, a manual valve 314, an electromagnetic shut-off valve 316, a first regulator 318, and a second regulator 320 are serially connected from the upstream side as a circuit. The manual valve 314 is the main shut-off valve for the fuel cylinders 80L, 80R, which is normally open. The electromagnetic shut-off valve 316 is opened and closed in accordance with the drive/stoppage of the fuel cell motorcycle 10. The first regulator 318 serves to lower high-pressure hydrogen gas to a predetermined pressure. The second regulator 320 regulates the pressure supplied to the injector unit 304 in accordance with the driving condition.

The injector unit 304 has a heat exchanger 322 for cooling hydrogen gas supplied from the pressure regulating unit 86, and an injector 324 and a differential pressure regulator 326 which are arranged in parallel on the downstream side of the heat exchanger 322. The secondary sides of the injector 324 and differential pressure regulator 326 are connected to the fuel cell 12, and hydrogen gas regulated to a predetermined pressure with respect to the pressure on the air side by the differential pressure regulator 326 is supplied. Unreacted hydrogen gas is sucked in from the gas-liquid separator 74 due to the sucking action of the injector 324 and introduced to the fuel cell 12 again, thereby forming a circulation path.

The hydrogen gas supplied to the fuel cell 12 is subjected to chemical reaction with reactant gas to generate electric power and then discharged as wet excess gas to be supplied to the gas-liquid separator 74 by way of a pipe line 330.

Figure 17:
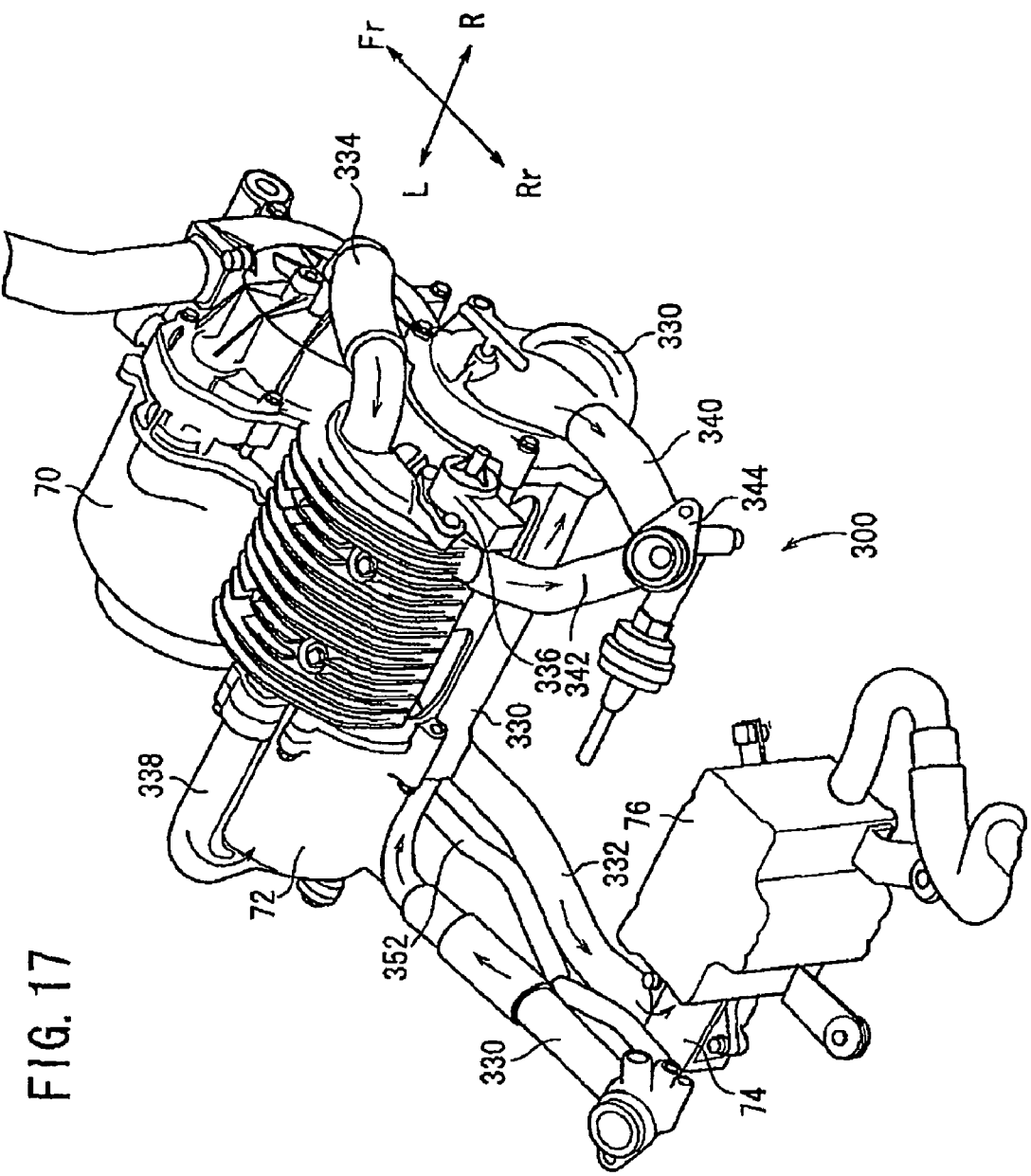
FIG. 17 is an actual layout view showing a circuit of the hydrogen system around a humidifier.

As shown in FIG. 17, off-gas supplied by way of the pipe line 330 is introduced from the right end into the humidifier 72 and undergoes, in a hollow fiber membrane assembly provided inside, moisture exchange with sweep gas supplied from the supercharger 70 and is discharged to a pipe line 332 from a lower portion located slightly on the left side from the center. On the other hand, high-temperature, dry sweep gas supplied from the supercharger 70 passes through a pipe line 334 and a pipe line 338 and introduced into the humidifier 72 from the left end, and after being humidified through moisture exchange with the sweep gas, discharged to a pipe line 340 from the right end. Thereafter, the humidified sweep gas passes through the pipe line 340 to be supplied to the fuel cell 12.

Further, in order to quickly warm up the fuel cell 12 at low-temperature start-up, the sweep gas can be directly supplied to the fuel cell 12 from a pipe line 342 through switching of a bypass valve 336. The pipe line 340 and the pipe line 342 are merged and connected to a supply joint 344 of the fuel cell 12. It should be noted that for easy understanding of the arrangement of the respective pipe lines, the main body of the fuel cell 12 is omitted in FIG. 17.

Returning to FIG. 15, moisture is separated and extracted in the gas-liquid separator 74 from the supplied wet hydrogen gas, and supplied and discharged to the dilution box 76 via an electromagnetic valve 350. On the other hand, the separated unreacted hydrogen gas is returned to the injector 324 via a return pipe line 352 or, depending on the driving condition, supplied to the dilution box 76 via an electromagnetic valve 354. Exhaust gas whose concentration of hydrogen is diluted with air/off-gas in the dilution box 76 is exhausted via the silencer 306.

As described above, in the cooling system 200 according to this embodiment, the first tank 102 and the thermostat 79 are connected to each other by the bypass pipe line 210. This means that, as a circuit, the thermostat 79 is connected to the first main pipe line 202. That is, the first tank 102 functions as a part of the passage of the first main pipe line 202, whereby only the bypass pipe line 210 suffices as the pipe line from the first main pipe line 202 to the thermostat 79, facilitating pipe line routing. Further, the freedom of the layout of components is increased.

In addition, the first main pipe line 202 is connected to the upper surface 12a of the fuel cell 12, thereby allowing air entering the fuel cell 12 to float upward to be smoothly discharged to the first main pipe line 202 for efficient removal. This makes it possible to suppress a decrease in the efficiency of power generation by the fuel cell.

Further, one end of the second main pipe line 204 is connected to the lower surface 12b of the fuel cell 12, whereby in the case where air enters the second main pipe line 204 as well, the air is discharged to the first main pipe line 204 via the fuel cell 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel cell motorcycle cooling system comprising:
   a radiator provided immediately in front of lower down pipes for radiating heat of coolant heated by a fuel cell;
   at least one cooling fan for circulating outside air through the radiator:
   a first main pipe line and a second main pipe line which allow the coolant to circulate between the fuel cell, which is located under a rider's seat, and the radiator;
   a water pump adapted to circulate the coolant, the water pump being located midway through the first main pipe line; and
   a thermostat located midway through the second main pipe line, the thermostat being selectively connected to a first elongated tank of the radiator by a bypass line,
   the first elongated tank being connected to the first main pipe line:
   wherein the radiator also includes:
   a second elongated tank connected to the second main pipe line; and
   a cooling portion provided between the first elongated tank and the second elongated tank, and adapted to perform heat exchange with the outside air,
   wherein the water pump, the thermostat, and the bypass line are arranged in positions at a front portion of an equipment mounting region immediately to a rear of the radiator, the positions being away from the fuel cell.

2. The fuel cell motorcycle cooling system according to claim 1, wherein the first elongated tank extends upwardly and rearwardly at an angle θ from horizontal, and the first main pipe line and the bypass pipe line are connected on opposite sides as viewed from a center position in an elongated direction of the first elongated tank.

3. The fuel cell motorcycle cooling system according to claim 1, wherein the fuel cell motorcycle runs on electric power obtained by supplying reactant gas and hydrogen gas to the fuel cell, and
   the bypass line is arranged in a lateral direction along a lower surface of a motorcycle body.

4. The fuel cell motorcycle cooling system according to claim 1, wherein
   the first main pipe line supplies the coolant heated by the fuel cell to the radiator,
   the second main pipe line supplies the coolant whose heat has been radiated by the radiator to the fuel cell, and
   one end of the first main pipe line is connected to an upper surface of the fuel cell.

5. The fuel cell motorcycle cooling system according to claim 1, wherein one end of the second main pipe line is connected to a lower surface of the fuel cell.

6. The fuel cell motorcycle cooling system according to claim 1, wherein the first main pipe line and the second main pipe line are provided on outer sides of the fuel cell in a vehicle width direction.

7. The fuel cell motorcycle cooling system according to claim 1, wherein an air vent port that can be opened and closed is provided at a connecting portion between the fuel cell and the first main pipe line,
   wherein the connecting portion is an upper joint that protrudes upwardly and includes:
      a lower portion connected to the upper surface of the fuel cell, and
      an upper portion connecting between the lower portion and the first main pipe line,
   wherein a lower surface of the lower portion is tilted in conformity with the upper surface of the fuel cell, and
   the upper surface of the lower part is substantially horizontal.

8. The fuel cell motorcycle cooling system according to claim 7, wherein an air vent port having a cover that can be opened and closed is provided at the upper joint disposed on the upper surface of the fuel cell and the first main pipe line.

9. The fuel cell motorcycle cooling system according to claim 7, wherein a radiator cap of a reservoir tank connected to the radiator is provided in order to allow air that has been discharged into the first main pipe line to eventually be discharged out of the cooling system.

10. The fuel cell motorcycle cooling system according to claim 1, wherein the first elongated tank is disposed on a side portion of the radiator to which the coolant in the fuel cell is supplied via the water pump.

11. The fuel cell motorcycle cooling system according to claim 10, wherein an air introduction port for introducing the coolant is provided at substantially an upper end of the first elongated tank, and
   an exhaust port connected to the thermostat is provided at substantially a lower end of the first elongated tank.

12. The fuel cell motorcycle cooling system according to claim 1, and further comprising:
   an ion exchanger cooling line connected from the thermostat to the first main pipe line; and
   an ion exchanger arranged at the front portion of the equipment mounting region and in a path of the outside air being circulated through the radiator by the at least one cooling fan;
   wherein at least a portion of the ion exchanger cooling line extends in a direction that is substantially parallel to the first main pipe line.

13. The fuel cell motorcycle cooling system according to claim 1, wherein the water pump is provided above an ion exchanger, and wherein the water pump and an ion exchanger are disposed forwardly of a voltage control unit (VCU) of a motorcycle, the water pump and the ion exchanger having lateral sides surrounded by left and right sub-frames.

14. The fuel cell motorcycle cooling system according to claim 13, wherein a part of the coolant is adapted to circulate from a port of the thermostat through the ion exchanger and is connected to the first main pipe line via a joint.

15. The fuel cell motorcycle cooling system according to claim 1, wherein a radiator cap of a reservoir tank connected to the radiator is provided in order to allow air that has been discharged into the first main pipe line to eventually be discharged out of the cooling system.

* * * * *